(12) United States Patent
Kim et al.

(10) Patent No.: US 11,716,628 B2
(45) Date of Patent: Aug. 1, 2023

(54) METHOD AND ELECTRONIC DEVICE FOR DETERMINING SECURITY THREAT ON RADIO ACCESS NETWORK

(71) Applicant: SAMSUNG ELECTRONICS CO., LTD., Suwon-si (KR)

(72) Inventors: Donguk Kim, Suwon-si (KR); Sangwon Gil, Suwon-si (KR); Choonghoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 17/091,275

(22) Filed: Nov. 6, 2020

(65) Prior Publication Data

US 2021/0144555 A1 May 13, 2021

Related U.S. Application Data

(60) Provisional application No. 62/932,680, filed on Nov. 8, 2019.

(30) Foreign Application Priority Data

Nov. 29, 2019 (KR) ........................ 10-2019-0156388

(51) Int. Cl.
*H04W 12/122* (2021.01)
*H04L 9/40* (2022.01)
*H04W 36/14* (2009.01)

(52) U.S. Cl.
CPC ....... *H04W 12/122* (2021.01); *H04L 63/1408* (2013.01); *H04L 63/1458* (2013.01); *H04L 63/20* (2013.01); *H04W 36/14* (2013.01)

(58) Field of Classification Search
CPC .......... H04W 12/12–128; H04W 36/14; H04L 63/14–1491; H04L 63/16–168; H04L 63/20
See application file for complete search history.

(56) References Cited

U.S. PATENT DOCUMENTS

| | | | |
|---|---|---|---|
| 2007/0157306 A1 | 7/2007 | Elrod et al. | |
| 2009/0073895 A1* | 3/2009 | Morgan | H04L 63/0227 370/255 |

(Continued)

FOREIGN PATENT DOCUMENTS

| | | | |
|---|---|---|---|
| EP | 2348440 | 7/2011 | |
| KR | 10-1678309 | 11/2016 | |
| WO | WO-2018050244 A1 * | 3/2018 | .......... G06F 11/3466 |

OTHER PUBLICATIONS

Author: Michael Kassner. Title: Deep Packet Inspection: What you need to know. Date: Jul. 27, 2008. Publisher: TechRepublic (Year: 2008).*

(Continued)

*Primary Examiner* — Madhuri R Herzog
(74) *Attorney, Agent, or Firm* — Nixon & Vanderhye P.C.

(57) ABSTRACT

Provided are an electronic device and a method for controlling the electronic device. According to the disclosure, an electronic device configured to perform a radio access network function comprises: a communication interface comprising communication circuitry, a processor operatively connected with the communication interface, and a memory operatively connected with the processor, wherein the memory stores instructions which, when executed, cause the processor to: receive, via the communication interface, wireless communication data transmitted via a radio access network, process the received wireless communication data based on a radio access network protocol by at least one first virtualized module corresponding to at least one function of the radio access network, identify an abnormal sign based on the received wireless communication data or a result of processing of the wireless communication data by the at least one first virtualized module, transfer security information indicating the abnormal sign to a second virtualized module by the at least one first virtualized module, and (Continued)

determine an expected security threat on the radio access network based on the security information indicating the abnormal sign by the second virtualized module.

18 Claims, 19 Drawing Sheets

(56) References Cited

U.S. PATENT DOCUMENTS

| | | | |
|---|---|---|---|
| 2011/0035802 | A1 | 2/2011 | Arajujo, Jr. et al. |
| 2016/0164897 | A1* | 6/2016 | Rubin ............... H04L 63/1408 726/23 |
| 2016/0294858 | A1* | 10/2016 | Woolward .......... H04L 63/0263 |
| 2016/0323067 | A1 | 11/2016 | Jana et al. |
| 2016/0373474 | A1 | 12/2016 | Sood et al. |
| 2017/0111382 | A1* | 4/2017 | Sood ................... H04L 63/1433 |
| 2017/0142155 | A1 | 5/2017 | Tasieski et al. |
| 2017/0223035 | A1* | 8/2017 | Watanabe ........... H04L 41/0896 |
| 2018/0145904 | A1* | 5/2018 | Alleman ................ H04L 63/30 |
| 2019/0173843 | A1 | 6/2019 | Liao et al. |

OTHER PUBLICATIONS

R. Sairam, S. S. Bhunia, V. Thangavelu and M. Gurusamy, "NETRA: Enhancing IoT Security Using NFV-Based Edge Traffic Analysis," in IEEE Sensors Journal, vol. 19, No. 12, pp. 4660-4671, 15 Jun. 15, 2019, doi: 10.1109/JSEN.2019.2900097. (Year: 2019).*

International Search Report and Written Opinion dated Feb. 2, 2021 in corresponding International Application No. PCT/KR2020/015436.

Extended European Search Report dated Jul. 18, 2022 for EP Application No. 20885082.6.

Mattos Diogo Menezes Ferrazani et al "An Agile and Effective Network Function Virtualization Infrastructure for the Internet of Things", Mar. 15, 2019, XP 055939077, Journal of Internet Services and Applications, vol. 10, No. 1.

Ahn Gail-Joon et al., "Dynamic DDOS Defense Resoursce Allocation Using Network Function Virtualization", Mar. 24, 2017, XP 055939601, pp. 37-42, Proceedings of the ACM International Workshop on Security in Software Defined Networks & Network Function Virtualization.

* cited by examiner

METHOD AND ELECTRONIC DEVICE FOR DETERMINING SECURITY THREAT ON RADIO ACCESS NETWORK

CROSS-REFERENCE TO RELATED APPLICATIONS

This application is based on and claims priority under 35 U.S.C. § 119 to U.S. Patent Application No. 62/932,680, filed on Nov. 8, 2019, in the U.S. Patent and Trademark Office, and Korean Patent Application No. 10-2019-0156388, filed on Nov. 29, 2019, in the Korean Intellectual Property Office, the disclosures of which incorporated by reference herein in their entireties.

BACKGROUND

Field

The disclosure relates to methods and electronic devices for determining security threats on a radio access network.

Description of Related Art

In order to meet the demand for wireless data traffic soaring since the 4th generation (4G) communication system came to the market, there are ongoing efforts to develop enhanced 5th generation (5G) communication systems or pre-5G communication systems. For this reason, the 5G communication system or pre-5G communication system may be referred to as the beyond 4G network communication system or post LTE system.

For higher data transmit rates, 5G communication systems are considered to be implemented on an mmWave band, such as, e.g., a band ranging from 6 GHz to 60 GHz. To mitigate pathloss on the mmWave frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G communication system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

As 4G communication systems and 5G communication systems are commercially available, virtualization-based techniques are adopted for communication network systems. For example, at least some of the functions of the wireless communication protocol which used to be processed by the base station are implemented, in the form of a software module, in a general-purpose device by network virtualization technology.

Although network virtualization technology has many advantages in light of flexibility and expandability, security threats and complexity of security management are increased accordingly. For example, network virtualization technology-applied equipment may experience malicious attacks which may cause security threats and, in a network virtualization technology-applied environment, if network equipment is abnormally operated due to the malicious attacks, there may be significant influence.

SUMMARY

Embodiments of the disclosure provide a security agent installed in the equipment in which virtualization technology has been applied for a radio access network (RAN), and a security threat on the equipment or network virtualized module is determined in real-time by the security agent. Thus, the security threat may be immediately dealt with, and various attacks using weaknesses in the wireless communication protocol may be detected and handled.

According to an example embodiment of the disclosure, an electronic device comprises: a communication interface, a processor operatively connected with the communication interface, and a memory operatively connected with the processor, wherein the memory stores instructions which, when executed, cause the processor to: receive, via the communication interface, wireless communication data transmitted via a radio access network, process the received wireless communication data based on a radio network protocol by at least one first virtualized module, identify wireless communication data corresponding to generated security information by a second virtualized module based on security information related to the wireless communication data being generated as the at least one first virtualized module is operated, and determine an expected security threat on the radio access network.

According to an example embodiment of the disclosure, a method for determining a security threat on a radio access network comprises: receiving, via the communication interface, wireless communication data transmitted via a radio access network, processing the received wireless communication data based on a radio network protocol by at least one first virtualized module, identifying security information related to the wireless communication data generated as the at least one first virtualized module is operated, identifying wireless communication data corresponding to the generated security information by a second virtualized module, and determining an expected security threat on the radio access network.

According to various example embodiments, in an electronic device with a virtual network function (VNF) module which is a virtualized radio access network device, a security agent is installed separately from the virtual network function (VNF) module to enable real-time determination of security threats, thereby minimizing and/or reducing latency for security threat processing.

According to various example embodiments, a virtual network function (VNF) module which is a virtualized radio access network device and a separate security agent for determining security threats on the radio access network are installed in the same piece of equipment, minimizing and/or reducing latency while reducing overhead which may arise when processing is performed by another piece of equipment.

According to various example embodiments, in an electronic device with a virtual network function (VNF) module which is a virtualized radio access network device, a separate security agent is installed to enable real-time determination of security threats. This allows for immediate countermeasures against attacks (e.g., DoS, DDS, spoofing, or exploit) to virtualized radio access network (vRAN) equipment. Further, even when an abnormal sign is found for the data processed by the vRAN, expected attacks may be dealt with without the need for rebooting or updating the piece of equipment.

According to various example embodiments, in an electronic device with a virtual network function (VNF) module which is a virtualized radio access network device, a separate security agent is installed, and a security server gathers and analyzes the results of analysis by each security agent, thereby making it possible to deal with various types of security attacks based on network topology information.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
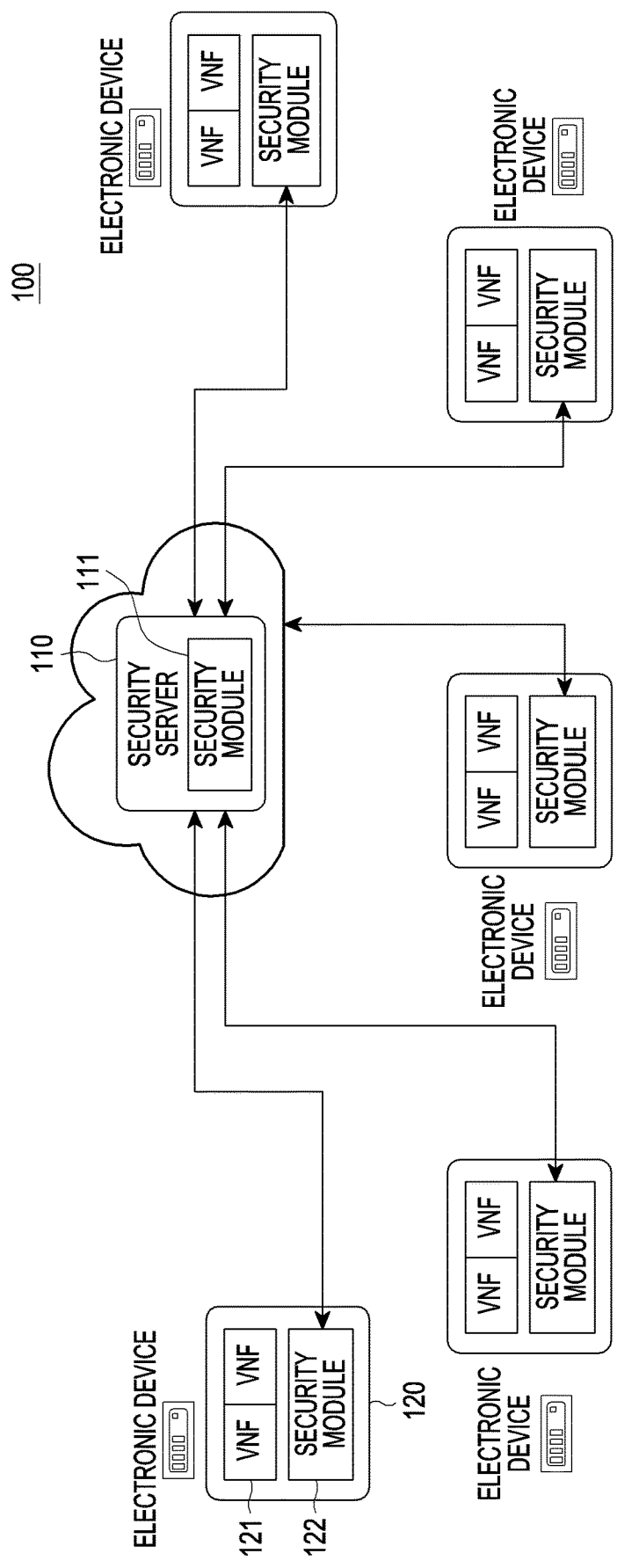
FIG. 1 is a diagram illustrating an example configuration of a system in a network environment according to an embodiment.

Hereinafter, various example embodiments of the disclosure are described in greater detail with reference to the accompanying drawings. When determined to make the subject matter of the disclosure unclear, the detailed description of the known art or functions may not be provided. The terms as used herein are defined considering the functions in the disclosure and may be replaced with other terms according to the intention or practice of the user or operator. Therefore, the terms should be defined based on the overall disclosure.

The terms as used herein are provided merely to describe various example embodiments thereof, but not to limit the disclosure. The terms as used herein are provided merely to describe some embodiments thereof, but not to limit the scope of other embodiments of the disclosure. Unless otherwise defined, all terms including technical and scientific terms used herein have the same meaning as commonly understood by one of ordinary skill in the art to which the embodiments of the disclosure pertain and should not be interpreted as overly broad or narrow. As used herein, incorrect or inappropriate terms for representing the spirit of the disclosure may be replaced with and understood as more proper ones to represent the spirit of the disclosure by one of ordinary skill in the art. General terms as used herein should be interpreted in the context of the disclosure or as defined in dictionaries.

As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

It will be understood that when an element or layer is referred to as being "on," "connected to," "coupled to," or "adjacent to" another element or layer, it can be directly on, connected, coupled, or adjacent to the other element or layer, or intervening elements or layers may be present. When a component is "directly connected to" or "directly coupled to" another component, no other intervening components may intervene therebetween.

Hereinafter, various example embodiments of the disclosure will be described in greater detail with reference to the accompanying drawings. The same reference denotations may be used to refer to the same or substantially the same elements throughout the disclosure and the drawings. No duplicate description of the same elements may be provided herein. The accompanying drawings are provided for an easier understanding of the spirit of the disclosure but the disclosure should not be limited thereby. It should be interpreted that the spirit of the disclosure may encompass all other changes, equivalents, or replacements of those shown in the drawings.

FIG. 1 is a diagram illustrating an example system configuration in a network environment according to an embodiment. Referring to FIG. 1, according to an embodiment, a system 100 may include a security server 110 and at least one electronic device 120. The security server 110 may include a security module (e.g., including processing circuitry and/or executable program elements) 111. The security module 111 may be a virtualized module which is installed, in the form of software, on the security server 110. According to an embodiment, the security server 110 may be implemented to be replaced with, or be included in, a security orchestrator (SO), element management system (EMS), or remote security agent. According to an embodiment, the security server 110 may be included in a server configured separately from the security orchestrator, element management system, or remote security agent. The security server 110 may be a server separately configured to perform security-related functions to be described below or may be a server for other purposes, or a general-purpose server, with security-related functions described below.

The electronic device 120 (or server) may include at least one virtualized module (e.g., including processing circuitry and/or executable program elements). According to an embodiment, the electronic device 120 may include at least one first virtualized module that processes wireless communication data based on a wireless network protocol. In the following description, the at least one first virtualized module may be referred to as a virtual network function (VNF) module 121 for ease of description. According to an embodiment, the electronic device 120 may include a second virtualized module that interworks with the at least one first virtualized module to process security-related functions for the at least one first virtualized module. In the following description, the second virtualized module may be referred to as a security module 122 or security agent (SA) for ease of description.

According to an embodiment, the VNF module 121 may include at least one some functions performed by at least one virtual radio access network (vRAN) device. The VNF module 121 may refer, for example, to a software module that may be installed on various virtual machines (VMs) to perform network traffic processing, and each VNF module 121 may perform configured virtualized radio access network services or part thereof. For example, each VNF module 121 may perform at least one radio access network function performed by a base station and may perform functions of, for example, and without limitation, at least one of a radio unit (RU), a digital unit (DU), a central/cloud unit (CU), or an access unit (AU) according to the configuration of the radio network. Various functions of the VNF module 121 are described in greater detail below with reference to FIGS. 2A and 2B.

The VNF module 121 may separate a specific network function in the network device from the default hardware, thereby providing a network function and service that may be dynamically or generally executed on an electronic device (or server) with a general-purpose processor. When a plurality of VNF modules 121 are arranged in the electronic device 120, the plurality of VNF modules 121 may perform the same or similar or different network functions. The VNF module 121 may replace at least one of various pieces of network equipment depending on the network functions it performs, and various arrangements or roles may be configured. Various embodiments of the VNF module 121 are described in greater detail below with reference to FIGS. 2A and 2B.

According to an embodiment, each electronic device 120 may include a security module 122. The security module 122 may interwork with each VNF module 121 configured in the electronic device 120 to perform at least one security-related function. For example, when an abnormal sign is identified for the wireless communication data processed based on a wireless network protocol configured as a specific VNF module 121 is operated, the security module 122 may determine presence of a radio access network security threat (e.g., denial of service (DoS), distributed DoS (DDoS), spoofing, exploit, etc.) expected in relation to the wireless communication data abnormal sign-identified by a security agent (or security module 122) installed separately from the VNF module 121.

Upon determining that specific wireless communication data is security threatening data, the security module 122 may configure or apply various security policies, such as, for example, and without limitation, instructing to discard or drop the wireless communication data, not to respond to the wireless communication data, to alert to the wireless communication data, or the like. According to an embodiment, when specific wireless communication data is determined to be security-threatening data or the security module 122 itself may not determine whether there is a security threat, the security module 122 may transmit security-related information to the security module 111 of the security server 110. The security module 111 of the security server 110 may receive the security-related information transmitted from the security module 122 of the electronic device 120 and perform additional analysis of the wireless communication data. The security module 111 of the security server 110 may establish a new security policy or update the existing security policy according to the results of additional analysis of the wireless communication data and provide the same to each electronic device 120. Various embodiments performed by the security module 111 of the security server 110 and the security module 122 of each electronic device 120 are described in greater detail below with reference to FIGS. 5A, 5B, 5C and 5D (which may be referred to hereinafter as FIGS. 5A to 5D for convenience).

Figure 2A:
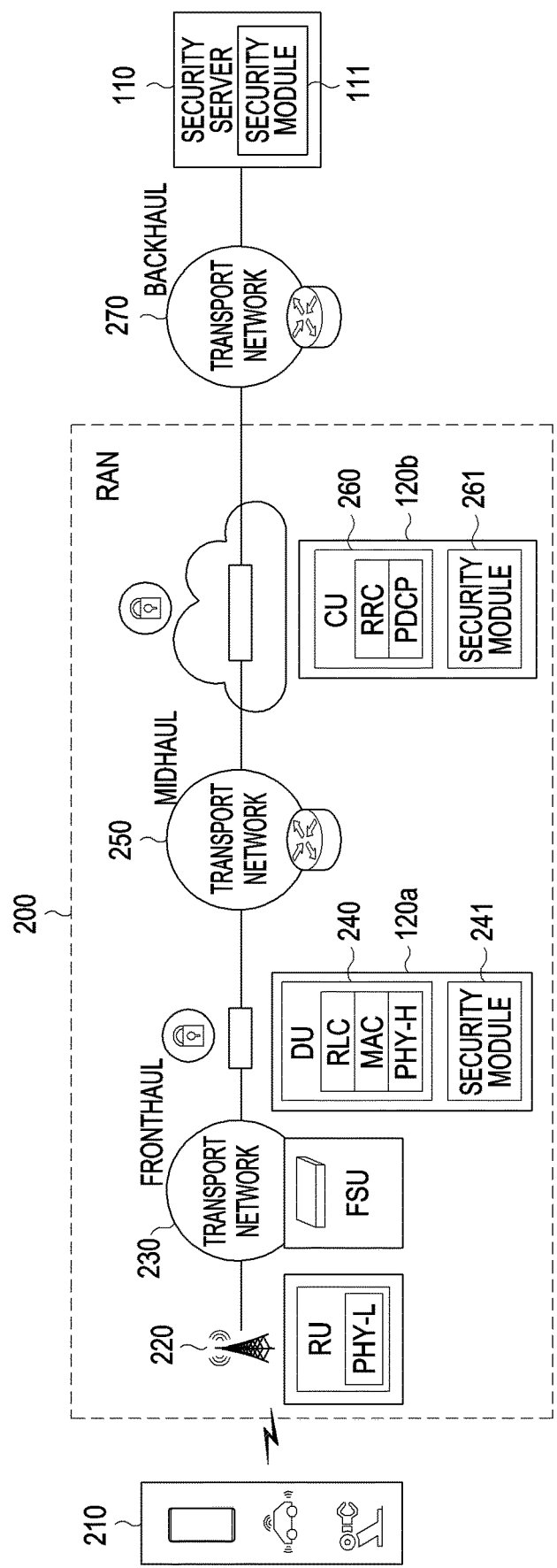
FIGS. 2A and 2B are diagrams illustrating example configurations of a radio access network according to an embodiment.

FIG. 2A is a diagram illustrating an example configuration of a radio access network system according to an embodiment. Referring to FIG. 2A, according to an embodiment, a radio access network (RAN) system 200 may include at least one of a radio unit (RU) 220, an electronic device 120a including the functions of a digital unit (DU) 240, and an electronic device 120b including the functions of a central/cloud unit (CU) 260. The RU 220 may communicate with a user terminal 210 via a radio space. The user terminal 210 may also be referred to as an electronic device, terminal, mobile equipment (ME), user equipment (UE), user terminal (UT), subscriber station (SS), wireless device, handheld device, or access terminal (AT). The user terminal 120 may be a device with communication functionality, such as, for example, and without limitation, a mobile phone, personal digital assistant (PDA), smartphone, wireless modem, laptop computer, or the like.

The RU 220 may perform processing corresponding to a lower physical layer (PHY-L) on the transmitted or received wireless communication data. The processing corresponding to the lower physical layer may include, for example, and without limitation, at least one of channel coding, antenna mapping, data modulation, or the like. The RU 220 may include a radio frequency (RF) module or an inter-frequency (IF) module and may convert the lower physical layer-processed data from the digital to analog signal by a digital-to-analog converter (DAC) and then convert the resultant signal into an IF signal or RF signal. The data converted into the RF signal may be transmitted via an antenna to the radio space.

The electronic device 120a including the functions of the DU 240 may communicate in a wired manner with the RU 220 via a transport network 230. The link or transmission network between the RU 220 and the electronic device 120a including the functions of the DU 240 may be denoted as a fronthaul. The DU 240 may receive the lower physical layer-processed data from the RU 220 and perform higher physical layer (PHY-H) processing. The higher physical layer processing may be defined in various manners and may include, for example, and without limitation, such processing as forward error correcting (FEC) or symbol mapping. The DU 240 may perform media access control (MAC) layer processing and radio link control (RLC) processing on the higher physical layer-processed data.

The electronic device 120b including the functions of the CU 260 may communicate in a wired manner with the electronic device 120a including the functions of the DU 240, via the transport network 250. The link or transmission network between the electronic device 120a including the functions of the DU 240 and the electronic device 120b including the functions of the CU 260 may be denoted as a midhaul. The CU 260 may receive the RLC layer-processed data from the DU 240 and perform packet data convergence protocol (PDCP) layer processing and radio resource control (RRC) layer processing on the received data.

According to an embodiment, the processing corresponding to the wireless communication protocol layer processed by the DU 240 or the CU 260 may be configured in the form of a virtualized software module (e.g., the VNF module 121) that may be dynamically and generally executed on an electronic device (or server) with a general-purpose processor.

According to an embodiment, the electronic device 120a including the functions of the DU 240 or the electronic device 120b including the functions of the CU 260 may include security modules 241 and 261, respectively, and the security modules 241 and 261 of FIG. 2A may correspond to the security module 122 of FIG. 1. The security module 241 included in the electronic device 120a including the functions of the DU 240 and the security module 261 of the electronic device 120b including the functions of the CU 260 may mutually transmit and receive security-related information or security-related messages.

The electronic device 120b including the functions of the CU 260 may communicate with the security server 110 via the transport network 270 which may be referred to as a backhaul. According to an embodiment, the security server 110 may include a security module 111. The security module 111 included in the security server 110 and the security module 241 included in the electronic device 120a including the functions of the DU 240 or the security module 261 of the electronic device 120b including the functions of the CU 260 may mutually transmit and receive security-related information or security-related messages. Specific functions and operations of the security modules 111, 241, and 261 are described in greater detail below with reference to FIGS. 5A to 5D.

Figure 2B:
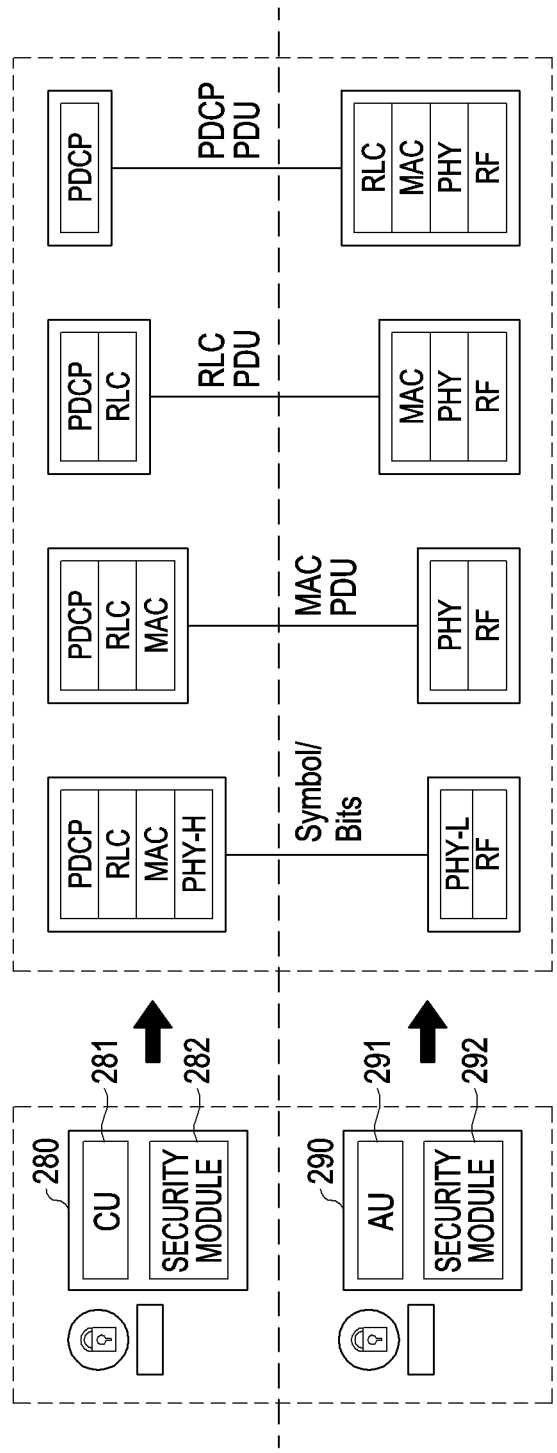

FIG. 2B is a diagram illustrating an example configuration of wireless communication protocol of AU and CU according to an embodiment. Referring to FIG. 2B, according to an embodiment, the layers of wireless communication protocol may be differentiated and processed in various manners. According to an embodiment, an electronic device 280 including the functions of a CU 281 may include a security module 282, and an electronic device 290 including the functions of an access unit (AU) 291 may include a security module 292. The security modules 282 and 292 may correspond to the security module 122 of FIG. 1. For example, wireless communication protocol processing by each of the RU 220, DU 240, and CU 260 as described above in connection with FIG. 2A may be configured in the form of the access unit (AU) 291 and CU 281 of FIG. 2B. According to an embodiment, as shown in FIG. 2B, the PDCP layer, the RLC layer, the MAC layer, and the PHY layer of the wireless communication protocol may be distributed to the CU 281 and the AU 291 as shown in FIG. 2B.

As an example, the AU 291 may perform RF processing and PHY-L layer processing, and the CU 281 may perform PHY-H layer processing, MAC layer processing, RLC layer processing, and PDCP layer processing. In this case, the data transmitted between the CU 281 and the AU 291 may be configured in the form of symbols or bits. As another example, the AU 291 may perform RF processing and PHY layer processing, and the CU 281 may perform MAC layer processing, RLC layer processing, and PDCP layer processing. In this case, the data transmitted between the CU 281 and the AU 291 may be configured in the form of MAC protocol data units (PDUs). As another example, the AU 291 may perform RF processing, PHY layer processing, and MAC layer processing, and the CU 281 may perform RLC layer processing and PDCP layer processing. In this case, the data transmitted between the CU 281 and the AU 291 may be configured in the form of RLC protocol data units (PDUs). As another example, the AU 291 may perform RF processing, PHY layer processing, MAC layer processing, and RLC layer processing, and the CU 281 may perform PDCP layer processing. In this case, the data transmitted between the CU 281 and the AU 291 may be configured in the form of PDCP protocol data units (PDUs).

According to an embodiment, each wireless communication protocol layer included in the CU 281 or AU 291 may be processed by a virtualized network function module (e.g., the VNF module 121 of FIG. 1).

Processing of the layers of the wireless communication protocol is described in greater detail below with reference to FIG. 3.

Figure 3:
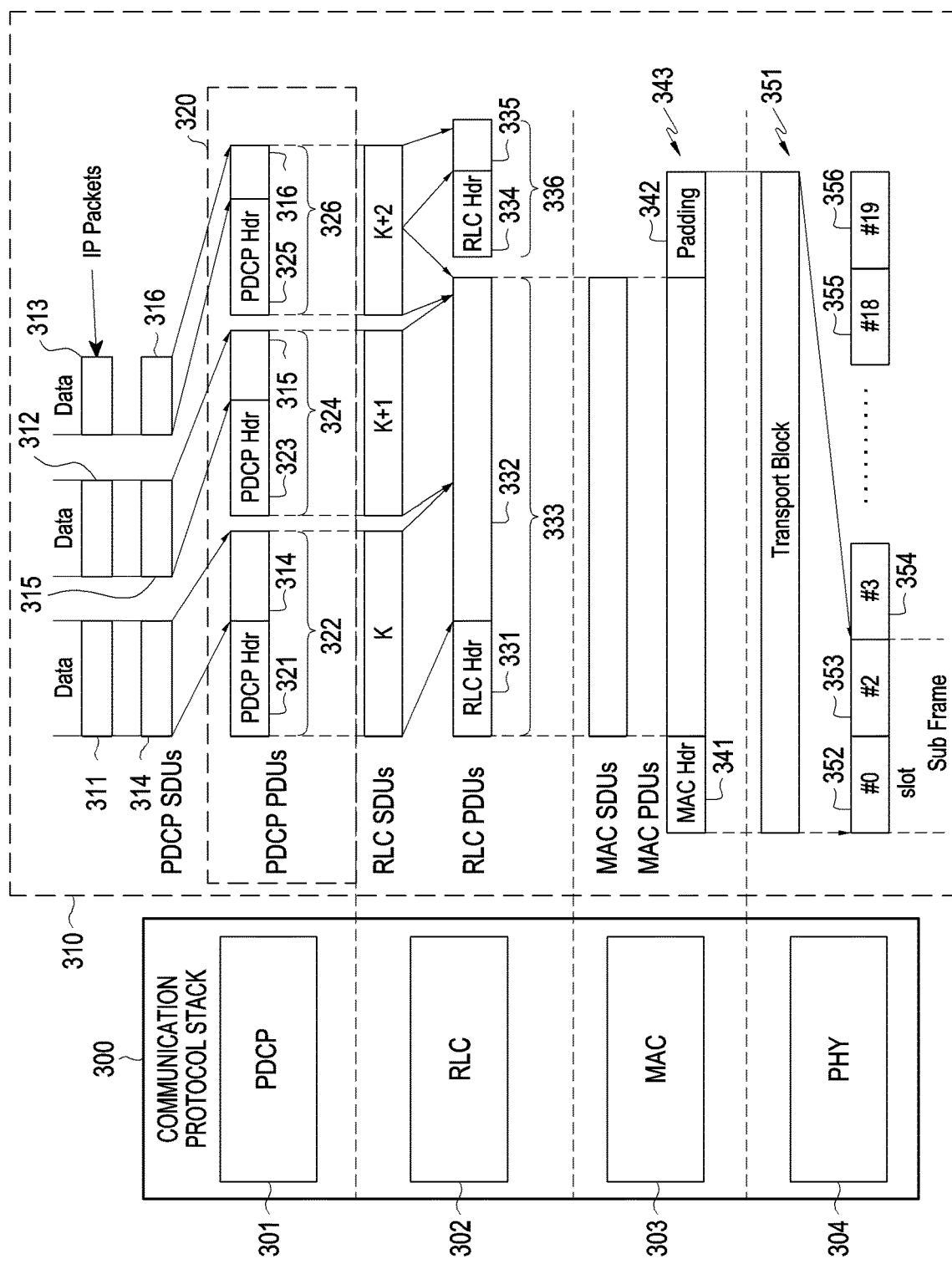
FIG. 3 is a diagram illustrating example data processing between the layers of a wireless communication protocol according to an embodiment.

FIG. 3 is a diagram illustrating an example structure of a wireless communication protocol stack according to an embodiment. According to an embodiment, a wireless communication protocol stack 300 may include a packet data convergence protocol (PDCP) entity 301, a radio link control (RLC) entity 302, a medium access control (MAC) entity 303, and a physical (PHY) entity 304.

According to an embodiment, the PDCP entity 301 may be in charge of IP header compression/restoration. Example functions of the PDCP entity 301 may be summarized as follows. According to an embodiment, in an E-UTRA NR dual connectivity (EN-DC) environment, NR PDCP may be included in the LTE protocol of the UE and base station to support various EN-DC functions.

header compression and decompression (ROHC only)
    transfer of user data
    in-sequence delivery of upper layer PDUs at PDCP re-establishment procedure for RLC acknowledged mode (AM)
    for split bearers in DC (only support for RLC AM), PDCP PDU routing for transmission and PDCP PDU reordering for reception
    duplicate detection of lower layer service data units (SDUs) at PDCP re-establishment procedure for RLC AM
    retransmission of PDCP SDUs at handover and, for split bearers in DC, of PDCP PDUs at PDCP data-recovery procedure, for RLC AM ciphering and deciphering timer-based SDU discard in uplink According to an embodiment, the radio link control (hereinafter, "RLC") 302 may reconstruct the PDCP packet data unit (PDU) into proper sizes and perform, e.g., ARQ operation. Example functions of the RLC entity 302 may be summarized as follows.

transfer of upper layer PDUs error correction through ARQ (only for acknowledged mode (AM) data transfer)

concatenation, segmentation and reassembly of RLC SDUs (only for unacknowledged mode (UM) and AM data transfer)

re-segmentation of RLC data PDUs (only for AM data transfer)

reordering of RLC data PDUs (only for UM and AM data transfer)

duplicate detection (only for UM and AM data transfer)

protocol error detection (only for AM data transfer)

RLC SDU discard (only for UM and AM data transfer)

RLC re-establishment

According to an embodiment, the MAC entity 303 is connected to several RLC layer devices configured in one UE and may multiplex RLC PDUs into an MAC PDU and demultiplex RCL PDUs from the MAC PDU. Example functions of the MAC entity 303 may be summarized as follows.

mapping between logical channels and transport channels multiplexing/demultiplexing of MAC SDUs belonging to one or different logical channels into/from transport blocks (TB) delivered to/from the physical layer on transport channels scheduling information reporting error correction through HARQ priority handling between logical channels of one UE priority handling between UEs by means of dynamic scheduling MBMS service identification transport format selection padding According to an embodiment, the PHY entity 304 channel-codes and modulates higher layer data into OFDM symbols, transmits the OFDM symbols through a wireless channel or demodulates OFDM symbols received through a wireless channel, channel-decodes and transfers the same to a higher layer.

Referring to FIG. 3, according to an embodiment, the wireless communication protocol stack 300 may include a PDCP entity 301, an RLC entity 302, a MAC entity 303, and a PHY entity 304. The PDCP entity 301, the RLC entity 302, the MAC entity 303, and the PHY entity 304 may be entities based on the radio protocol of LTE system or entities based on the radio protocol of NR system. For example, if the electronic device transmits/receives data based on LTE, the PDCP entity 301, RLC entity 302, MAC entity 303, and PHY entity 304 based on the radio protocol of LTE system may be configured. For example, if the electronic device transmits/receives data based on NR, the PDCP entity 301, RLC entity 302, MAC entity 303, and PHY entity 304 based on the radio protocol of NR system may be configured. For example, packet data processed based on the PDCP entity 301, RLC entity 302, MAC entity 303, and PHY entity 304 may be stored at least temporarily in some logical area or some physical area of the memory 310 of the electronic device, as shown in FIG. 3. According to an embodiment, the PDCP entity 301 may further include PDCP headers 321, 323, and 325 in PDCP SDUs 314, 315, and 316 which are based on data 311, 312, and 313 which are internet protocol (IP) packets and may transfer PDCP PDUs 322, 324, and 326. The PDCP header information transferred by the LTE PDCP entity may differ from the PDCP header information transferred by the NR PDCP entity. According to an embodiment, the PDCP buffer 320 may be implemented in a designated logical area or physical area inside the memory 310. The PDCP buffer 320 may receive the PDCP SDUs 314, 315, and 316 based on the PDCP entity 301 and, at least temporarily, store them, and the PDCP buffer 320 may further include the PDCP headers 321, 323, and 325 in the PDCP SDUs 314, 315, and 316 and transfer the PDCP PDUs 322, 324, and 326 to the RLC layer. According to an embodiment, the RLC entity 302 may add the RLC headers 331 and 334 to the first data 332 and second data 335, respectively, which have been obtained by reconstructing the RLC SDUs 322, 324, and 326 and may transfer the RLC PDUs 333 and 336. The LTE-based RLC header information may differ from the NR-based RLC header information.

According to an embodiment, the MAC entity 302 may add the MAC header 341 and padding 342 to, e.g., the MAC SDU 333 and transfer the MAC PDU 343 which, as the transport block 351, may be processed in the physical layer 304. The transport block 351 may be processed as slots 352, 353, 354, 355, and 356.

According to an embodiment, although not shown in FIG. 3, the memory 310 may include a buffer corresponding to each of the RLC layer and the MAC layer.

Figure 4:
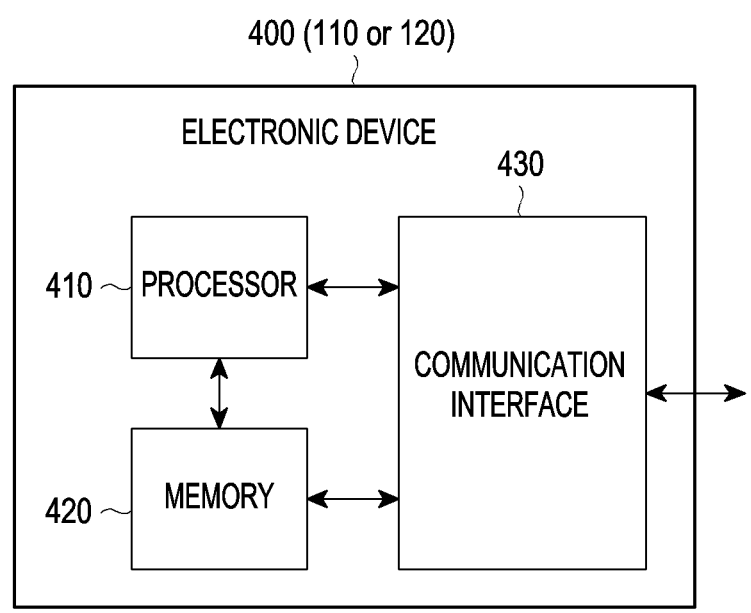
FIG. 4 is a block diagram illustrating an example configuration of an electronic device according to an embodiment.

FIG. 4 is a block diagram illustrating an example configuration of an electronic device according to an embodiment of the disclosure. Referring to FIG. 4, an electronic device 400 (e.g., the security server 110 or electronic device 120 (or server) of FIG. 1) may include a processor (e.g., including processing circuitry) 410, a memory 420, and/or a communication interface (e.g., including communication circuitry) 430.

The communication interface 430 may include various communication circuitry and denote hardware that may perform communication with at least one external electronic device and transmit and receive various pieces of information (or data). The communication interface 430 may transmit and receive data using a communication protocol, such as the transmission control protocol/Internet protocol (TCP/IP), user datagram protocol (UDP), hypertext transfer protocol (HTTP), secure hypertext transfer protocol (HTTPS), file transfer protocol (FTP), secure file transfer protocol (SFTP), and message queuing telemetry transport (MQTT), but is not limited thereto.

The communication interface 430 may be connected with an external electronic device via a wired or wireless communication network. In this case, the network may be a personal area network (PAN), local area network (LAN), or wide area network (WAN), depending on the area or size of the network, and may be an intranet, extranet, or Internet depending on network openness.

The wireless communication may include at least one of contact mask schemes, such as long-term evolution (LTE), LTE advance (LTE-A), 5th generation (5G) mobile communication, code division multiple access (CDMA), wideband CDMA (WCDMA), universal mobile telecommunications system (UMTS), wireless broadband (WiBro), global system for mobile communications (GSM), time division multiple access (DMA), wireless-fidelity (Wi-Fi), Bluetooth, near-field communication (NFC), or Zigbee. The wired communication may include at least one of communication schemes, such as Ethernet, optical network, universal serial bus (USB), Thunderbolt, high definition multimedia interface (HDMI), recommended standard (RS)-232, power line communication, and plain old telephone service (POTS). The communication interface 430 may include a network interface or network chip according to the above-described wired/wireless communication scheme.

The memory 420 may include hardware that stores data or information in an electric or magnetic form to be accessed by the processor 410. To that end, the memory 420 may be implemented as at least one hardware device among non-volatile memories, volatile memories, flash memories, hard disk drives (HDDs), solid state drives (SSD), random access memory (RAM) or read-only memory (ROM).

The memory 420 may store at least one instruction, module, or data necessary for the operation of the electronic device 400 or the processor 410. The instruction may include a code unit instructing the electronic device 400 or processor 410 to operate and may be one created in a computer-understandable language, e.g., machine language. The module may be a set of series of instructions to perform a specific task in task units. The data may be information in bits or bytes, which may represent a letter, number, or image.

According to an embodiment, the memory 420 may store program information corresponding to at least one software module (e.g., the VNF module 541, 542, 543, or 544) or security agent 550, or remote security agent 510) described below. According to an embodiment, the memory 420 may store various pieces of security-related information (e.g., abnormal sign information or security policy information) to be used in the embodiments described below. The VNF module may refer, for example, to a software module that may be installed on a virtual machine (VM) (or implemented in the form of a container) to perform network traffic processing as described above, and each VNF module may perform configured virtualized radio access network services or part thereof. The remote security agent 510 may be installed on a virtual machine (VM) (or implemented in the form of a container) as is the above-described VNF module, processing functions related to the security of each VNF module.

The memory 420 may be accessed by the processor 410, and reading/recording/modifying/deleting/updating of instructions, modules, or artificial intelligence models, or data may be carried out by the processor 410.

The processor 410 may include various processing circuitry including one or more processors. The processor 410 may be implemented as a general-purpose processor, such as, for example, and without limitation, a central processing unit (CPU), a dedicated processor, an application processor (AP), a graphics-dedicated processor, such as a graphic processing unit (GPU) or vision processing unit (VPU), an artificial intelligence-dedicated processor, such as a neural processing unit (NPU), or the like. The processor 410 may control the overall configuration of the electronic device 400. The processor 410 may be operated based on at least one operating system (OS) without limitations to a specific OS. For example, although the processor 410 is described below as operated on the Unix or Linux OS, embodiments of the disclosure are not limited thereto.

According to an embodiment, the processor 410 may load and execute the program code corresponding to each VNF module stored in the memory 420. As the VNF module is executed, the processor 410 may perform a configured virtualized radio access network service or part thereof and may perform at least one radio access network function which is performed by the base station.

According to an example embodiment of the disclosure, an electronic device configured to perform a radio access network function comprises: a communication interface comprising communication circuitry, a processor operatively connected with the communication interface, and a memory operatively connected with the processor, wherein the memory stores instructions which, when executed, cause the processor to: receive, via the communication interface, wireless communication data transmitted via a radio access network, process the received wireless communication data based on a radio access network protocol using at least one first virtualized module corresponding to at least one function of the radio access network, identify an abnormal sign based on the received wireless communication data or a result of processing of the wireless communication data by the at least one first virtualized module, transfer security information indicating the abnormal sign to a second virtualized module by the at least one first virtualized module, and determine, by the second virtualized module, an expected security threat on the radio access network based on the security information indicating the abnormal sign.

According to an example embodiment, the at least one first virtualized module may include a virtual network function (VNF) configured to process the wireless communication data based on a wireless network protocol.

According to an example embodiment, the second virtualized module may include a security agent (SA) configured to process a function related to security for the at least one first virtualized module while interworking with the at least one first virtualized module.

According to an example embodiment, the instructions, when executed, may cause the processor to generate security information related to the wireless communication data by a security monitoring (SM) module executed in the first virtualized module.

According to an example embodiment, the first virtualized module may process the received wireless communication data based on at least one of packet data convergence protocol entity (PDCP) layer processing, radio link control entity (RLC) layer processing, medium access control (MAC) layer processing, or physical entity (PHY) layer processing.

According to an example embodiment, the expected security threat on the radio access network may include at least one of denial of service (DoS), distributed DoS (DDoS), spoofing, or exploit attack.

According to an example embodiment, the second virtualized module may be configured to determine the security threat by identifying data of a higher layer than a radio network layer processed by the at least one first virtualized module, based on the security information.

According to an example embodiment, the second virtualized module may be configured to transmit a configured countermeasure to the at least one first virtualized module upon determining the expected security threat on the radio access network.

According to an example embodiment, the configured countermeasure may include at least one of a drop, unresponsive, or alert process for the wireless communication data.

According to an example embodiment, the second virtualized module may be configured to identify wireless communication data corresponding to the generated security information to generate a security report, and to transmit the generated security report to a security server configured to manage security of equipment which perform the radio access network function.

According to an example embodiment, the second virtualized module may be configured to receive a security policy corresponding to the at least one first virtualized module from the security server and apply the received security policy to a first virtualized module corresponding to the security policy, among the at least one first virtualized module.

According to an example embodiment, the first virtualized module may be configured to determine that there is the abnormal sign based on more than a designated number of data bytes or data packets being received within a designated time, based on more than a designated number of terminals transmitting wireless communication data, or based on a specific wireless communication protocol being identified on a payload of the received wireless communication data a designated number of times or more.

According to an example embodiment, the second virtualized module may be configured to: identify payload information for the received wireless communication data and determine the security threat on the radio access network based on at least one of terminal identification information, a number of times of transmission or reception of a wireless communication protocol, or ciphered-or-not.

According to an example embodiment, a system configured to perform a radio access network function may include one or more radio access network servers configured to: process wireless communication data via a virtualized radio access network function, identify an abnormal sign, and transmit security information showing the abnormal sign and one or more security devices electrically connected with the one or more radio access network servers and determining an expected security threat on a radio access network based on the security information received from the one or more radio access network servers.

Figure 5A:
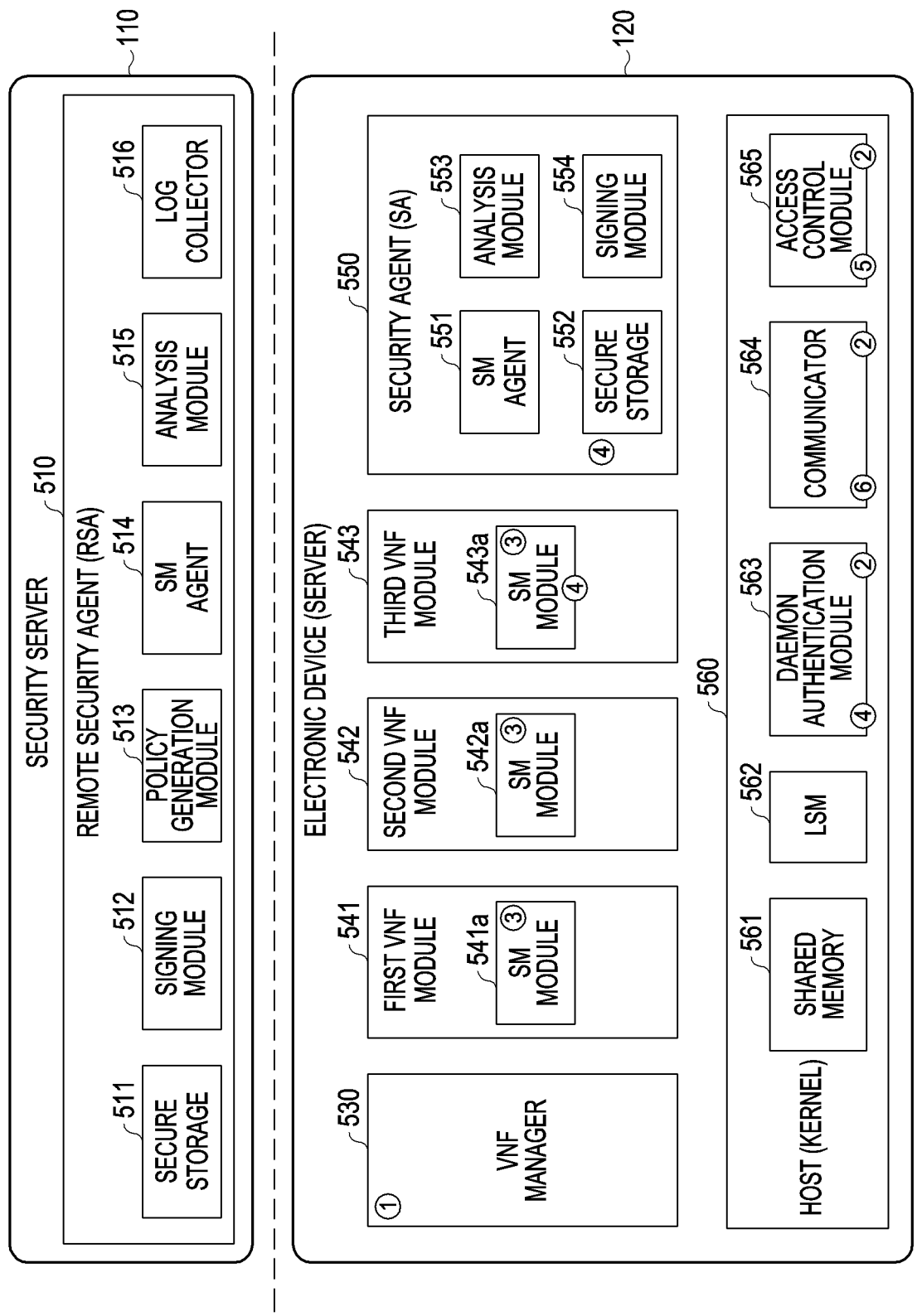
FIG. 5A is a block diagram illustrating an example configuration of a security server and an electronic device according to an embodiment.

FIGS. 5A, 5B, 5C and 5D are block diagrams illustrating an example configuration of a security server and an electronic device according to an embodiment. Referring to FIG. 5A, the security server 110 may include a remote security agent (RSA) 510 (e.g., the security module 111 of FIG. 1). The security server 110 may be a server separately configured to perform security-related functions to be described below or may be a server for other purposes, or a general-purpose server, with security-related functions described below.

According to an embodiment, the RSA 510 may include secure storage 511, a signing module (signer) 512, a policy generation module (policy generator) 513, a security monitoring (SM) agent 514, an analysis module (packet analyzer) 515, and a log collector 516, each of which may include various processing circuitry and/or executable program elements.

According to an embodiment, the electronic device 120 may include a virtual network function (VNF) manager 530, at least one first virtualized module (e.g., at least one VNF module (e.g., a first VNF module 541, a second VNF module 542, and a third VNF module 543)), and a second virtualized module (e.g., a security agent (SA)) 550.

The VNF modules 541, 542, and 543 may include security monitoring (SM) modules 541a, 542a, and 543a, respectively. According to an embodiment, the SM modules 541a, 542a, and 543a may be included, in the form of software, in the VNF modules 541, 542, and 543, as part of the VNF modules 541, 542, and 543. Thus, when the processor 410 loads the program code corresponding to each VNF module stored in the memory 420, the SM module 541a, 542a, or 543a may be loaded and executed as part of the program code.

When the function related to a specific wireless communication network protocol (e.g., each wireless communication protocol performed in the DU 240, AU 291, or CU 260 or 281) in the VNF module 541, 542, or 543 is performed, the SM module 541a, 542a, or 543a included in each VNF module 541, 542, or 543 may perform a designated function.

According to an embodiment, the SM modules 541a, 542a, and 543a may be implemented as processors that are executed all the time or as necessary in the VNF modules 541, 542, and 543.

According to an embodiment, when an abnormal sign is identified in the data currently being processed in the VNF module 541, 542, or 543, the corresponding SM module 541a, 542a, or 543a may be invoked to transfer information related to the abnormal sign to the security agent 550. Further, the information transferred via the SM module 541a, 542a, or 543a to the security agent 550 when an abnormal sign is identified from the data being processed in the VNF module 541, 542, or 543 may be configured in various manners. For example, the transferred abnormal sign-related information may include at least one of abnormal sign information, identification information (e.g., packet identification number) regarding the data (or packet) for which the abnormal sign has been identified, or the data (or packet) for which the abnormal sign has been identified.

According to an embodiment, various methods may be implemented for the SM module 541a, 542a, or 543a to transfer the information to the security agent 550. For example, in the case where an abnormal sign is identified for the data being processed in the VNF module 541, 542, or 543, if the SM module 541a, 542a, or 543a is invoked, the identified abnormal sign information, the identification information (e.g., packet identification number) regarding the abnormal sign-identified data (or packet), or the abnormal sign-identified data (or packet) may be transferred to the security agent 550 as the invoked SM module 541a, 542a, or 543a is operated. As another method, in the case where the SM module 541a, 542a, or 543a is an always-on process, a specific wireless communication network protocol processed by the VNF module 541, 542, or 543 may be hooked to identify an abnormal sign and, according to the result of identification, the abnormal sign information, the identification information (e.g., packet identification information) regarding the abnormal sign-identified data (or packet), or the abnormal sign-identified data (or packet) may be transferred to the security agent 550.

According to an embodiment, various methods may be configured to determine an abnormal sign for the data being processed in the VNF module 541, 542, or 543. For example, the VNF module 541, 542, or 543 may determine that there is the abnormal sign when more than a designated number of data bytes or data packets are received within a designated time, when more than a designated number of terminals transmit wireless communication data, or when a specific wireless communication protocol is identified on a payload of the received wireless communication data, a designated number of times or more. Example embodiments of a method for determining an abnormal sign are described in greater detail below with reference to FIGS. 6, 7, 8, 9, 10, 11 and 12 (which may be referred to hereinafter as FIGS. 6 to 12 for convenience).

According to an embodiment, the security agent 550 may receive information related to the data determined to have an abnormal sign from the VNF module 541, 542, or 543. The security agent 550 may determine an expected security threat on the radio access network based on the information related to the abnormal sign-identified wireless communication data.

According to an embodiment, the security agent 550 may identify payload information for the data determined to have an abnormal sign and determine the security threat on the radio access network based on at least one of terminal identification information, a number of times of transmission or reception of a wireless communication protocol, or ciphered-or-not. Example embodiments of a method for determining a security threat are described in greater detail below with reference to FIGS. 6 to 12.

According to an embodiment, various methods may be configured to determine an abnormal sign for the data being processed in the VNF module 541, 542, or 543. According to an embodiment, the VNF module 541, 542, or 543 may determine that there is an abnormal sign when a mobile communication protocol standard is not met. For example, in the case where an essential security procedure disclosed in the mobile communication protocol standard is omitted, and the next step is performed, the VNF module 541, 542, or 543 may normally proceed with processing on the protocol corresponding to the next step. However, since the essential security procedure disclosed in the standard is omitted, it may be determined to be an abnormal sign for an attack that does not follow the mobile communication protocol standard.

According to an embodiment, even when the procedure disclosed in the mobile communication protocol standard is observed, if a specific circumstance occurs, this may be determined to be an abnormal sign. For example, in the cases where integrity may not be verified for the data observing the standard procedure, a message that should be ciphered and transmitted is transmitted as plain text, or the field value of the data header or payload is not the expected value, the VNF module 541, 542, or 543 may determine that the data has an abnormal sign even when the data observes the standard procedure.

According to an embodiment, the operation of determining an abnormal sign may include a security check preconfigured on a specific wireless communication protocol packet. Table 1 below illustrates an example of determining an abnormal sign via a security check processed in the VNF module 541, 542, or 543, but embodiments of the disclosure are not limited thereto.

denoted as a security log, error log, security data, or security information in the disclosure.

Although FIG. 5A illustrates that the electronic device 120 includes three VNF modules, the electronic device 120 may include only one VNF module or two VNF modules, or four or more VNF modules according to various embodiments. Each VNF module 541, 542, or 543 may correspond to the VNF module 121 of FIG. 1.

As described above, each VNF module 541, 542, or 543 may refer, for example, to a software module that may be installed on various virtual machines (VMs) or containers to perform network traffic processing, and each VNF module 541, 542, or 543 may perform configured virtualized radio access network services or part thereof. According to an embodiment, each VNF module 541, 542, or 543 may perform at least one radio access network function performed by a base station and may perform functions of, for example, and without limitation, at least one of the radio unit (RU), the digital unit (DU), the central/cloud unit (CU), or the access unit (AU) of FIG. 2A or 2B according to the configuration of the radio network.

The VNF module 541, 542, or 543 may separate a specific network function in the network device from the default hardware, thereby providing a network function and service that may be dynamically or generally executed on an electronic device (or server) with a general-purpose processor. The plurality of VNF modules 541, 542, and 543 may perform the same or similar or different network functions. For example, the plurality of VNF modules 541, 542, and 543 may replace at least one of various pieces of equipment (e.g., network-related equipment) depending on the network functions they perform, and various arrangements or roles may be configured. According to an embodiment, the first VNF module 541 and the second VNF module 542 may perform the functions of the AU 290, and the third VNF module 543 may perform the functions of the CU 280. The first VNF module 541 and the second VNF module 542 may perform the functions of the DU 240, and the third VNF module 543 may perform the functions of the CU 260. Various embodiments of the disclosure are not limited thereto but may rather be configured in various combinations.

TABLE 1

| | |
|---|---|
| abnormal sign classifications | determine abnormality for target procedure/message |
| abnormal sign when standard procedure is observed | message allowed to be transmitted as plain text<br>message not allowed to be transmitted as plain text<br>message with invalid integrity protection<br>message with invalid sequence number |
| abnormal sign not observing standard procedure | mutual authentication procedure<br>key agreement procedure |

According to an embodiment, if there is determined to be an abnormal sign as a result of a per-item security check exemplified in Table 1 above, the VNF module 541, 542, or 543 may invoke the SM module 541a, 542a, or 543a and transmit the abnormal sign-related information (e.g., abnormal sign information, identification information regarding the data (or packet) for which there is determined to be an abnormal sign, and the abnormal sign-identified data (or packet)) to the security agent 550. According to an embodiment, the abnormal sign-related information (e.g., the abnormal sign information), the identification information (e.g., packet identification number) regarding the abnormal sign-identified data (or packet), or the abnormal sign-identified data (or packet) transferred to the security agent 550 may be The security agent 550 may include a security monitoring (SM) agent 551, secure storage 552, an analysis module (packet analyzer) 553, and a signing module (signer) 554 and, according to various embodiments, may perform various security-related functions.

The kernel which plays a role as a host 560 for each module (e.g., the VNF manager 530, VNF module 541, 542, or 543, or security agent 550) included in the electronic device 120 may include a shared memory 561, a Linux security module (LSM) 562, a daemon authentication module (daemon verifier) 563, a communicator (e.g., including communication circuitry) 564, and an access control module (access controller) 565.

Security-related procedures performed by each of the above-described functional blocks are described below in detail with reference to FIGS. 5A to 5D, according to an embodiment.

Referring to FIG. 5A, when each VNF module 541, 542, or 543 performs processing according to a specific wireless communication network protocol, the SM module 541a, 542a, or 543a included in each VNF module 541, 542, or 543 may perform a designated function. According to an embodiment, if an abnormal sign is identified for the data being processed in a specific VNF module 541, 542, or 543, the corresponding SM module 541a, 542a, or 543a may be invoked, notifying the security agent 550 of the abnormal sign-related information (security information) (e.g., abnormal sign information, abnormal sign-identified data (or packet) or identification information regarding the data (or packet) for which there is determined to be an abnormal sign). As another method, the SM module 541a, 542a, or 543a may directly identify the abnormal sign by hooking the data (e.g., wireless communication network protocol-related data) being processed in the specific VNF module 541, 542, or 543. The abnormal sign for the data being processed may be identified by performing a security check on the header or payload of the data (e.g., protocol data unit (PDU)) processed by the specific VNF module 541, 542, or 543. For example, if an error is determined to occur in the sequence number as a result of the PDU header check on the data, the SM module 541a, 542a, or 543a of the VNF module 541, 542, or 543 may determine that the data has an abnormal sign, but embodiments of the disclosure are not limited thereto. Various embodiments related to identifying an abnormal sign via the VNF module 541, 542, or 543 or the SM module 541a, 542a, or 543a are described below in detail for each wireless communication protocol.

According to an embodiment, when the data being currently processed in the specific VNF module 541, 542, or 543 is identified to have an abnormal sign, the SM module 541a, 542a, or 543a may transfer security information to the SM agent 551 of the security agent 550. According to an embodiment, when an abnormal sign is identified, the SM module 541a, 542a, or 543a may transfer the abnormal sign information or identification information regarding the abnormal sign-identified data (or packet) alone to the security agent 550 to allow the security agent 550 to directly identify the abnormal sign-identified data or packet using the data or packet identification information. According to an embodiment, when an abnormal sign is identified, the SM module 541a, 542a, or 543a may directly transfer the abnormal sign-identified data or packet to the SM agent 551.

When the SM agent 551 receives the abnormal sign information, identification information regarding the abnormal sign-identified data, or the abnormal sign-identified data (or packet) from the SM module 541a, 542a, or 543a, the security agent 550 may additionally analyze the data (or packet) via the analysis module 553. According to an embodiment, the analysis module 553 may analyze up to the communication protocol layer processed by the VNF module 541, 542, or 543 which has processed the abnormal sign-identified data or may analyze up to a higher communication protocol layer than the communication protocol layer processed by the VNF module 541, 542, or 543. For example, if an abnormal sign is identified for the data (e.g., MAC PDU) while the MAC layer protocol data is being processed in the VNF module 541, 542, or 543, the analysis module 553 of the security agent 550 may additionally analyze the MAC layer for the abnormal sign-identified data and even up to the data of the RLC layer, PDCP layer, or RRC layer which is a higher layer. According to an embodiment, when the analysis module 553 is to analyze data of a higher layer than the VNF module 541, 542, or 543, it may receive an authentication key or deciphering key for analyzing the data of the higher layer from an external electronic device or other VNM module and analyze the same.

The analysis module 553 may determine an expected attack or security threat by the data via data analysis. For example, the expected attack determined by the analysis module 553 may include, for example, and without limitation, at least one of denial of service (DoS), distributed DoS (DDoS), spoofing, exploit attack, or the like. Example embodiments of determining an expected attack or security threat by the analysis module 553 are described in greater detail below with reference to FIGS. 6 to 12.

According to an embodiment, if an abnormal sign is identified for the data being processed in a specific VNF module 541, 542, or 543, the specific VNF module 541, 542, or 543 may transmit a result of specific identification of the abnormal sign to the analysis module 553 of the security agent 550. For example, if the data being processed in the specific VNF module 541, 542, or 543 includes an invalid sequence number, the specific VNF module 541, 542, or 543 may transmit a specific identification result, such as the sequence number or information indicating that the sequence number is invalid according to the result of identification of the abnormal sign, to the analysis module 553 of the security agent 550. By receiving the specific identification result, the security agent 550 may identify specific abnormal sign-related information as well as the abnormal sign for the data. The analysis module 553 may quickly determine whether there is a security threat based on the specific identification result according to the identification of the abnormal sign received from the specific VNF module 541, 542, or 543.

According to an embodiment, if it is determined by the analysis module 553 that there is a security threat or an expected attack, a pre-configured countermeasure or security policy may be applied based on the result of determination. For example, the SM agent 551 may transmit information related to the configured security policy to the VNF module 541, 542, or 543 to apply the security policy to the abnormal sign-identified data (or packet). According to an embodiment, the configured security policy may include, for example, and without limitation, at least one of a drop, unresponsive, or alert process for the wireless communication data or the packet.

According to an embodiment, upon determining that it is impossible to detect attacks only with information about the node (e.g., the electronic device 120) or an attack is suspected so that an additional check is required, according to the result of analysis by the analysis module 553, the SM agent 551 may transmit the data to the remote security agent 510 of the security server 110 to send a request for additional analysis.

As described above, as the security agent 550 is configured as a virtualized module separate from at least one VNF module 541, 542, or 543 in the electronic device 120, security-related processing on the VNF module 541, 542, or 543 may be carried out more efficiently. For example, the at least one VNF module 541, 542, or 543 is rendered to focus only on processing as per the wireless communication protocol while security-related additional operations are allowed to be performed separately by the security agent 550. This may raise both wireless communication protocol processing efficiency and security-related processing efficiency while enabling efficient operation of resource management in the electronic device 120. According to an embodiment, as at least one VNF module 541, 542, or 543 is configured as a virtualized module separate from the security agent 550 in the electronic device 120, the functions of the security agent 550 may be updated, with the operation of the at least one VNF module 541, 542, or 543 maintained, upon updating the functions of the security agent 550. The above-described security-related procedure performed by the electronic device 120 is described below in greater detail in association with the kernel 560.

Referring to FIG. 5A, the VNF manager 530 may manage each VNF module 541, 542, or 543 or the security agent 550, and the managing functions of the VNF manager 530 may include such functions as installing, deleting, or updating each VNF module 541, 542, or 543 or security agent 550. According to an embodiment, the VNF manager 530 may configure the security agent 550 to always operate to perform security-related functions (①  of FIG. 5A).

According to an embodiment, the kernel 560 may be configured to have a daemon authentication module 563, a communicator 564, and an access control module 565 installed thereon and operated (② of FIG. 5A). When each VNF module 541, 542, or 543 is installed on the electronic device 120, the corresponding SM module 541a, 542a, or 543a may be configured to be included in the VNF module 541, 542, or 543 (③ of FIG. 5A). At this time, binary location information and hash value for the virtualized image of each VNF module 541, 542, or 543 including the SM module 541a, 542a, or 543a may be stored in the secure storage 552 of the security agent 550 by the daemon authentication module 563 (④ of FIG. 5A).

According to an embodiment, the access control module 565 may give all the VNF modules 541, 542, and 543 the right to write to the shared memory 561 included in the kernel 560 (⑤ of FIG. 5A). The communicator 564 may be configured to monitor the LSM 562 and to identify the operation of the LSM 562 to obtain necessary information (⑥ of FIG. 5A) According to an embodiment, if an abnormal sign is identified in the specific VNF module 541, 542, or 543 so that the corresponding SM module 541a, 542a, or 543a is invoked and the abnormal sign-related information (security information) is recorded in the shared memory 561, and a variation (read/write) in the shared memory 561 is detected by the LSM 562, the communicator 564 may monitor the LSM 562 and transfer the abnormal sign-related information to the security agent 550.

Figure 5B:
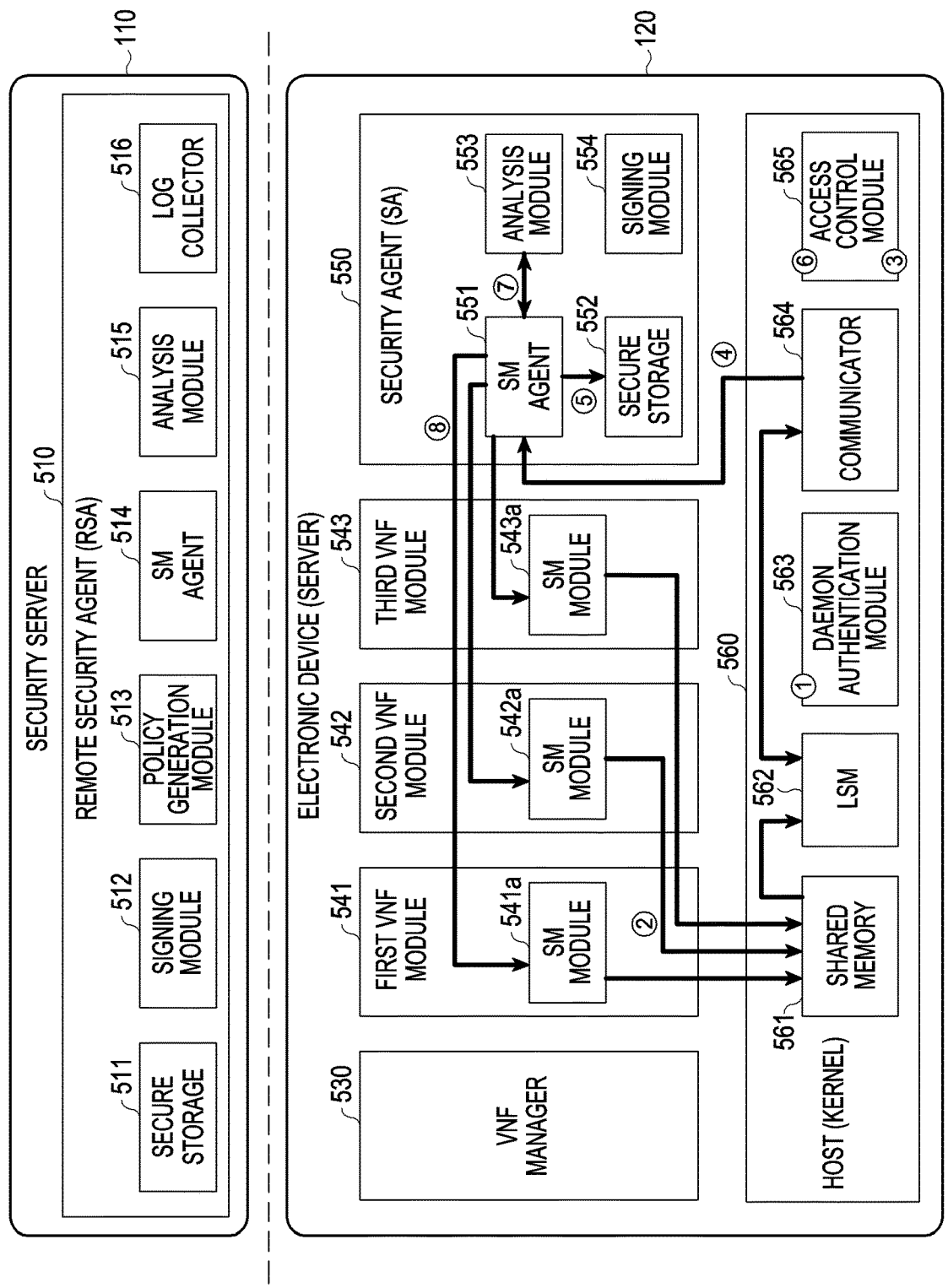
FIG. 5B is a diagram illustrating an example log collecting operation by an electronic device according to an embodiment.

For example, referring to FIG. 5B, when each VNF module 541, 542, or 543 performs processing according to a specific wireless communication network protocol, the SM module 541a, 542a, or 543a included in each VNF module 541, 542, or 543 may perform a designated function. If the SM module 541a, 542a, or 543a installed in the VNF module 541, 542, or 543 is executed, the integrity of each SM module 541a, 542a, or 543a may be verified in various manners (e.g., Hash verification or certificate) via the daemon authentication module 563 (① of FIG. 5B). If each VNF module 541, 542, or 543 is operated, and an abnormal sign is identified in a specific VNF module, information related to the abnormal sign may be recorded in the shared memory 561 via the SM module 541a, 542a, or 543a (② of FIG. 5B). The access control module 565 may withdraw each VNF module's right to write to the shared memory 561 to stop the recorded abnormal sign-related information from varying (③ of FIG. 5B). The communicator 564 may monitor the LSM 562 and transfer the abnormal sign-related information and location information about the VNF module 541, 542, or 543 including the SM module 541a, 542a, or 543a to the SM agent 551 (④ of FIG. 5B). The SM agent 551 may perform authentication on the corresponding VNF module 541, 542, or 543 based on the location information about the VNF module 541, 542, or 543 including the SM module 541a, 542a, or 543a, received via the LSM 562 and, if authenticated as normal, store the received abnormal sign-related information in the secure storage 552 (⑤ of FIG. 5B). The access control module 565 may reallocate the right to write to the shared memory 561 of each VNF module 541, 542, or 543 (⑥ of FIG. 5B).

According to an embodiment, the SM agent 551 may transmit the received abnormal sign-related information to the analysis module 553. The analysis module 553 may determine a security threat based on the abnormal sign-related information received from the SM agent 551, generate security policy information corresponding to the security threat, and transmit the security policy information to the SM agent 551 (⑦ of FIG. 5B). The SM agent 551 may perform processing to apply a new security policy to the corresponding VNF module 541, 542, or 543 based on the security policy information received from the analysis module 553 (⑧ of FIG. 5B). According to an embodiment, the SM agent 551 may transfer the new security policy to the corresponding VNF module 541, 542, or 543 via the VNF manager 530 to apply the new security policy to the VNF module 541, 542, or 543. The SM agent 551 may transfer the new security policy via a combination of at least one or more of the shared memory 561, the LSM 562, the communicator 564, or the access control module 565 in the same manner as each VNF module 541, 542, or 543 transfers the abnormal sign-related information (security information).

Figure 5C:
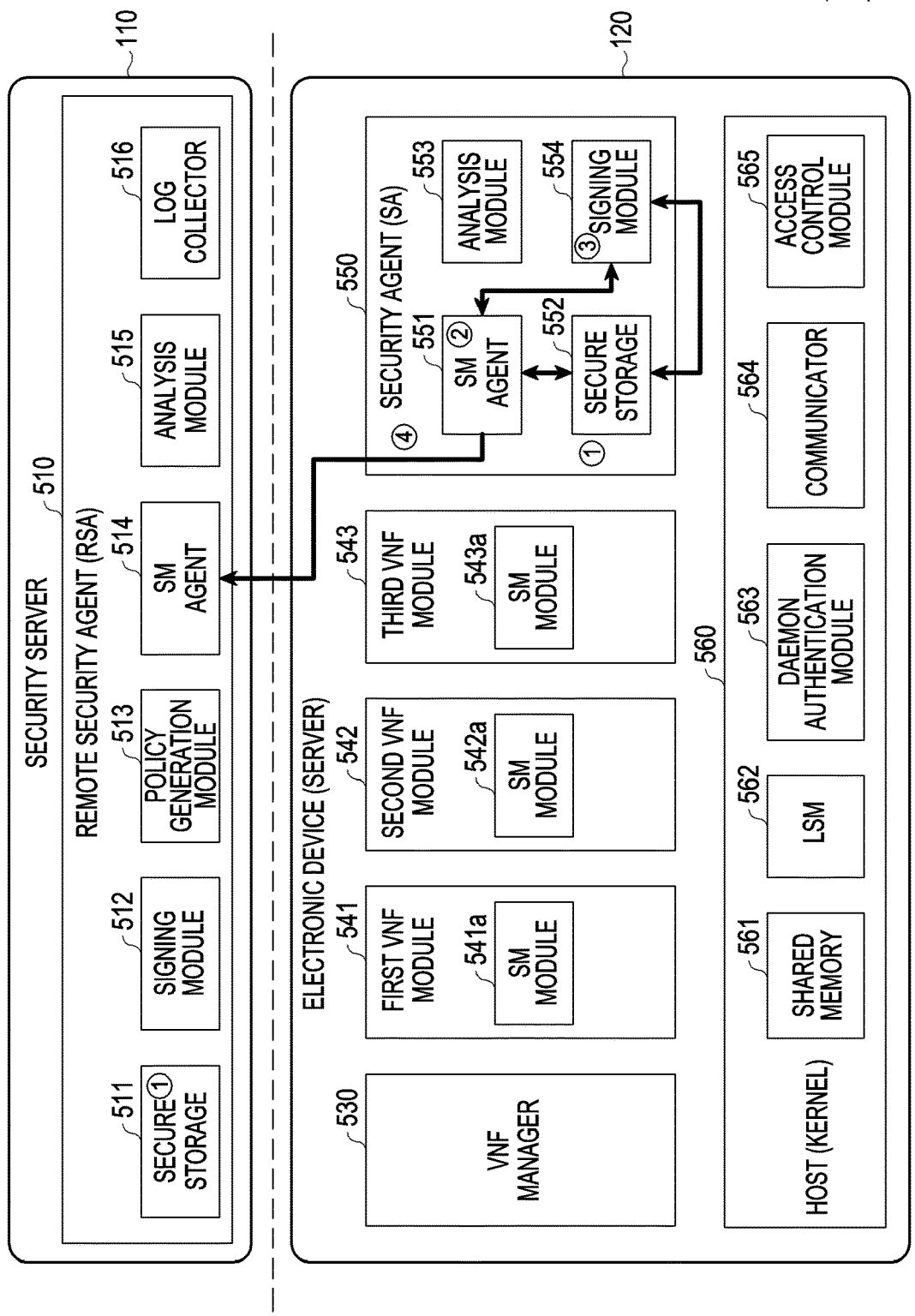
FIG. 5C is a diagram illustrating an example operation of transmitting a security report from an electronic device to a security server according to an embodiment.

Referring to FIG. 5C, a procedure for transmitting a security report to the security server 110 by the security agent 550 of the electronic device 120 is described below in detail with reference to FIG. 5C. Referring to FIG. 5C, the SM agent 551 included in the security agent 550 of the electronic device 120 and the SM agent 514 included in the remote security agent 510 of the security server 110 may store mutually authenticable certificates and private keys in the secure storage 552 and 511 (① of FIG. 5C). The SM agent 551 of the security agent 550 may classify, per VNF module 541, 542, or 543, the abnormal sign-related information stored in the secure storage 552, generate a security report, and transfer the generated security report to the signing module 554 (① of FIG. 5C). The signing module 554 may sign the security report using the key stored in the secure storage 552 (① of FIG. 5C). The security agent 550 may transfer the signed security report to the SM agent 514 of the remote security agent 510 via the SM agent 551 (① of FIG. 5C).

A procedure of generating a security policy and transmitting the security policy to the electronic device 120 and applying the security policy to each VNF module 541, 542, or 543 by the remote security agent 510 of the security server 110 is described below in greater detail with reference to FIG. 5D.

Figure 5D:
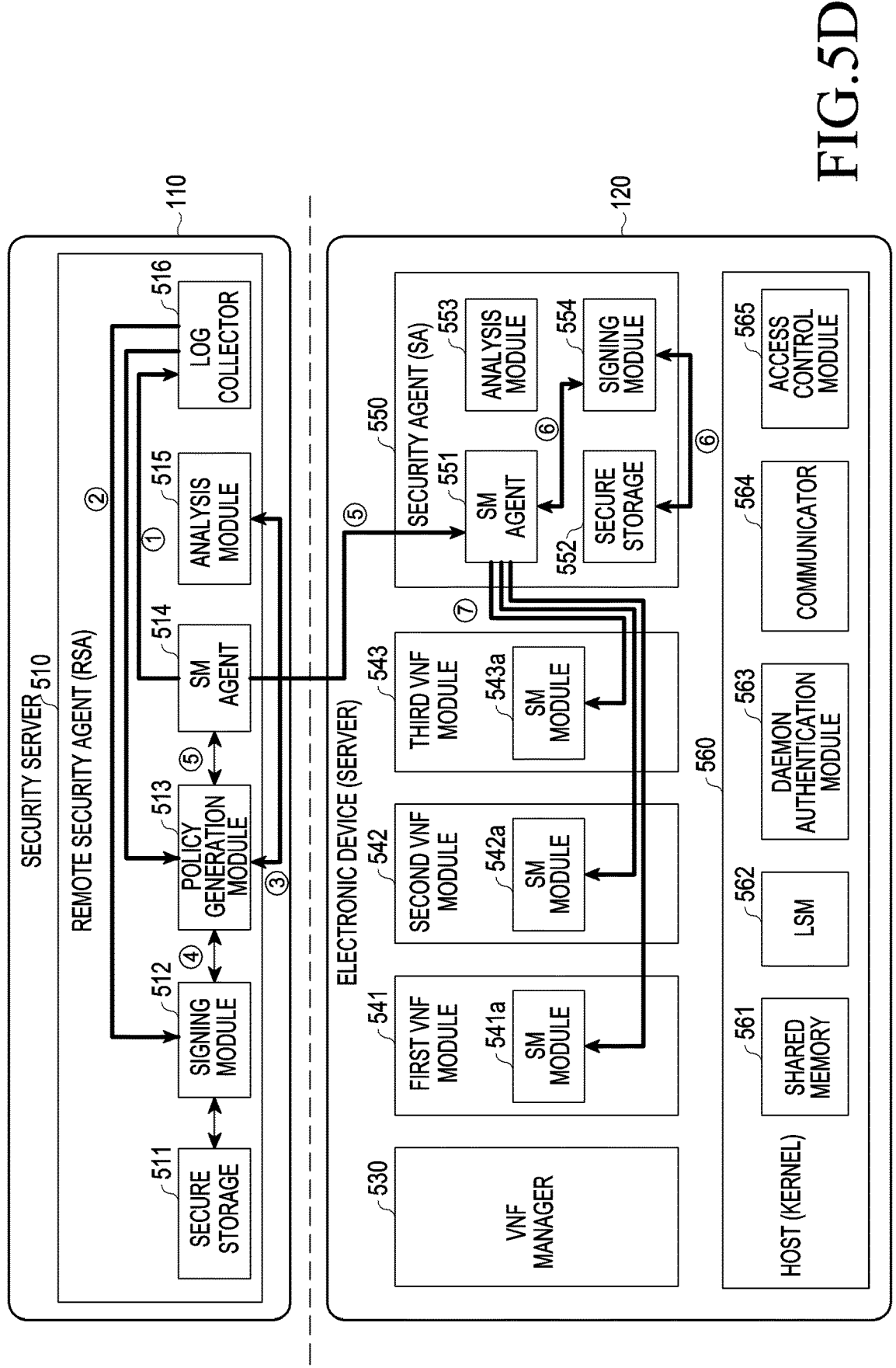
FIG. 5D is a diagram illustrating an example operation of generating and applying a security policy by a security server according to an embodiment.

Referring to FIG. 5D, the SM agent 514 of the remote security agent 510 may transfer the security report transmitted from the SM agent 551 of the electronic device 120 to the log collector 516 (① of FIG. 5D). The log collector 516 may transmit the security report received from the SM agent 551 to the signing module 512. The signing module 512 may identify the signature value stored in the secure storage 511, perform authentication processing on the security report, and then transmit the result of authentication to the log collector 516 (② of FIG. 5D). According to an embodiment, if the security report is authenticated as normal, the log collector 516 may transmit the authenticated security report to the SM agent 514. The SM agent 514 may transfer the security report authenticated as normal to the policy generation module 513, and the policy generation module 513 may perform analysis as to whether there is a security threat via the analysis module 515. The policy generation module 513 may generate new security policy information to be applied to each VNF module 541, 542, or 543 according to the result of analysis by the analysis module 515 (③ of FIG. 5D). The policy generation module 513 may transfer the generated new security policy information to the signing module 512. The signing module 512 may sign the new security policy information generated by the policy generation module 513 using the key stored in the secure storage 511 and may then transmit the signed security policy information to the policy generation module 513 (④ of FIG. 5D). The policy generation module 513 may transmit the signed security policy information to the SM agent 514. The remote security agent 510 may transfer the signed new security policy information to the SM agent 551 of the electronic device 120, via the SM agent 514 (⑤ of FIG. 5D). Upon receiving the new security policy information, the SM agent 551 of the security agent 550 may transmit the new security policy information to the signing module 554. The signing module 554 may identify and thus authenticate the signature using the key stored in the secure storage 552 and transmit the result of authentication to the SM agent 551 (⑥ of FIG. 5D). The SM agent 551 may classify the new security policy authenticated as normal per VNF module 541, 542, or 543 and perform processing to apply the new security policy to the VNF module 541, 542, or 543 (⑦ of FIG. 5D).

Specific examples of security policies generated by the remote security agent 510 of the security server 110 and applied to each VNF module 541, 542, or 543 are described in greater detail below with reference to FIGS. 13 and 14.

According to an embodiment, the plurality of VNF modules 541, 542, and 543 shown in FIGS. 5A to 5D may be configured to be included in different electronic devices. For example, the first VNF module 541 may be configured as at least one VNF module included in a first electronic device, and the second VNF module 542 may be configured as at least one VNF module included in a second electronic device configured separately from the first electronic device.

According to an embodiment, the security agent 550 shown in FIGS. 5A to 5D may be configured to be included in an electronic device different from the plurality of VNF modules 541, 542, and 543. For example, the plurality of VNF modules 541, 542, and 543 may be configured as at least one VNF module included in the first electronic device, and the security agent 550 may be configured as at least one virtualized module included in the second electronic device configured separately from the first electronic device.

When so configured, the plurality of VNF modules 541, 542, and 543 included in the first electronic device (e.g., a radio access network server) may process wireless communication data via a virtualized radio access network function. The plurality of VNF modules 541, 542, and 543 included in the first electronic device (e.g., a radio access network server) may identify an abnormal sign and transmit security information, which shows the abnormal sign, to the second electronic device (e.g., a security device or security server) configured separately from the first electronic device. The security agent included in the second electronic device may receive security information from the plurality of VNF modules 541, 542, and 543 and determine an expected security threat on the radio access network based on the received security information.

According to an embodiment, in the case where the first VNF module 541 includes a module performing the functions of a DU in the example described above in connection with FIG. 5A (e.g., when it is a virtualized module to replace the function of a piece of DU equipment), it may perform PHY-H, MAC, and RLC layer protocol data processing. For example, in FIG. 5A, the first VNF module 541 of the electronic device 120 may perform at least one of the MAC layer protocol data processes described above in connection with FIG. 3.

FIGS. 6, 7, 8 and 9 are diagrams illustrating an example scenario in the MAC layer according to an embodiment. The MAC layer may provide a role to manage radio resource access between UE and base station (e.g., eNB or gNB) in a specific cell. According to an embodiment, the UEs in the cell may be differentiated via cell radio network temporary identities (C-RNTI) which may be managed in the MAC layer. For example, the C-RNTI may be an identity for RRC access and be a unique UE identity used for scheduling.

Figure 6:
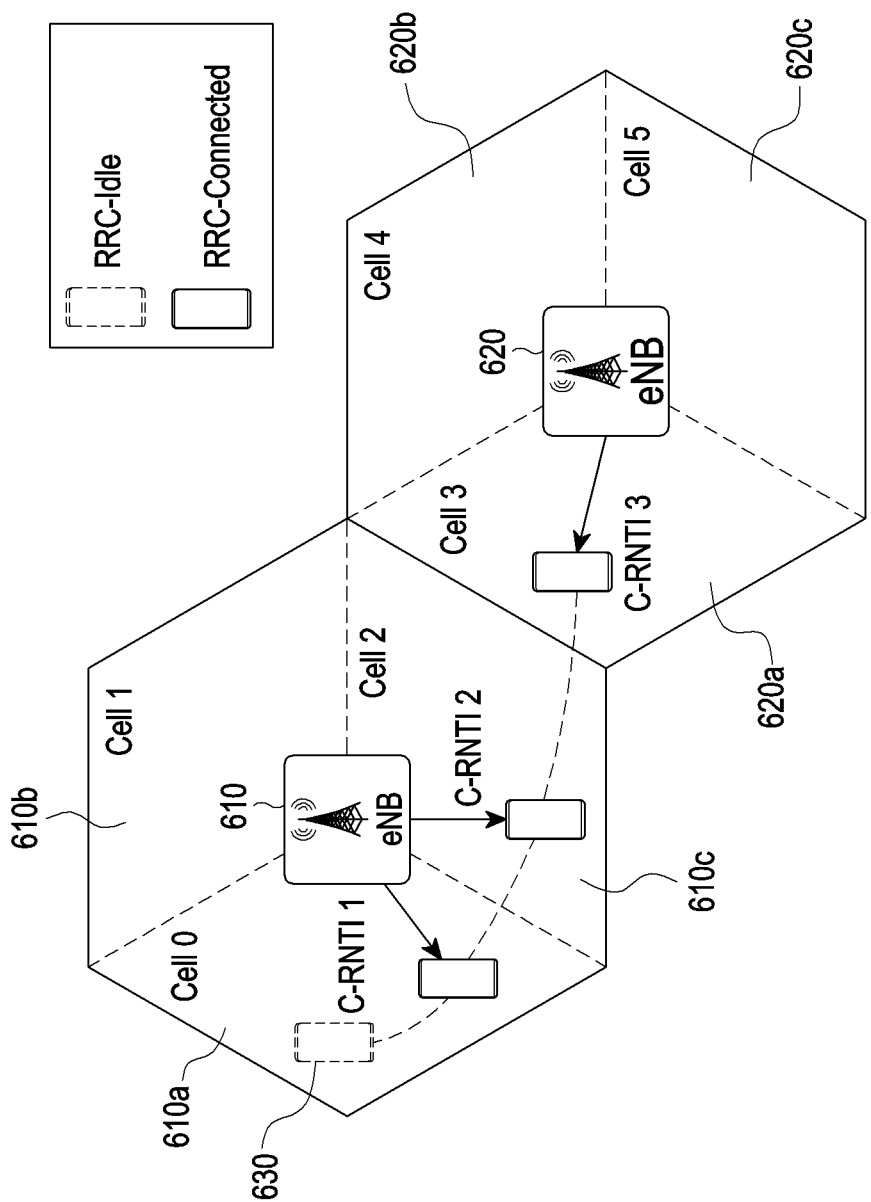
FIG. 6 is a diagram illustrating an example MAC layer operation to be performed by a VNF module according to an embodiment.

Referring to FIG. 6, the user equipment (UE) 630 in RRC-idle state may be located in Cell 0 610a among the cells (e.g., Cell 9 610a, Cell 1 610b, and Cell 2 610c) managed by a first base station (eNB) 610. The UE 630 may perform a cell search for the first base station 610 and proceed with a radio access procedure (e.g., a radio resource control (RRC) connection procedure) on Cell 0 610a of the first base station 610. The UE 630 which has finished the radio access procedure may switch from the RRC-Idle state to an RRC-Connected state.

Figure 7:
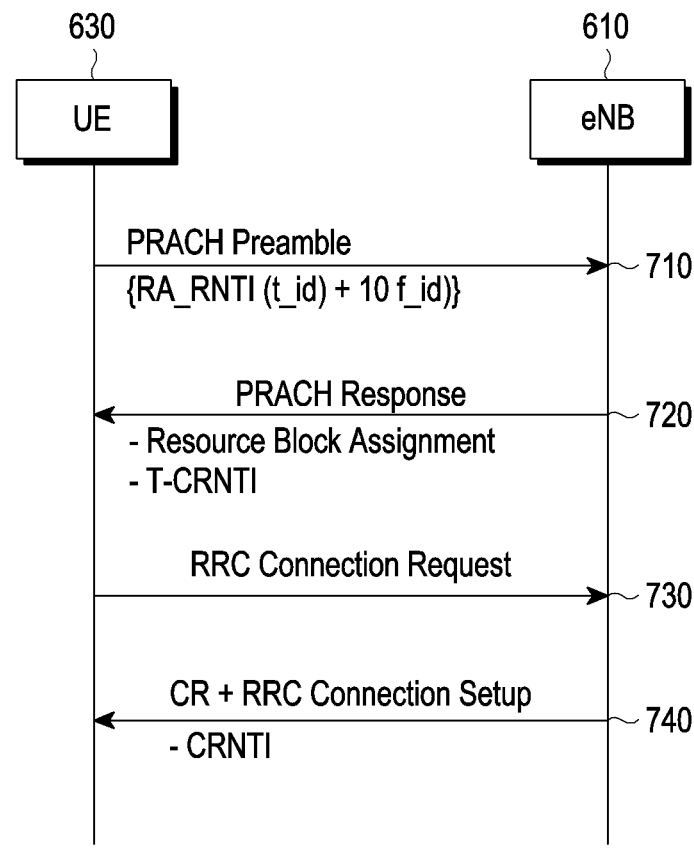
FIG. 7 is a signal flow diagram illustrating an example MAC layer operation to be performed by a VNF module according to an embodiment.

FIG. 7 is a signal flow diagram illustrating an example radio access procedure between the UE 630 and the first base station (eNB) 610. Referring to FIG. 7, the UE 630 may transmit a physical random access channel (PRACH) preamble to the first base station 610 based on, at least, a signal (e.g., primary synchronization signal (PSS) and/or secondary synchronization signal (SSS)) received from the first base station 610, in operation 710. For example, the UE 630 may identify the PRACH parameter corresponding to the first base station 610 from master information block (MIB) or secondary information block (SIB) information received from the first base station 610 and transmit the PRACH preamble based on the identified PRACH parameter.

According to an embodiment, in operation 720, the UE 630 may receive a PRACH response from the first base station 610, in response to transmission of the PRACH preamble. The PRACH response message may include resource block assignment information and a CRNTI. In operation 730, the UE 630 may generate an RRC connection request message including the CRNTI and transmit the RRC connection request message in response to reception of the PRACH response. According to an embodiment, in operation 740, the first base station 610 may transmit an RRC connection response message to the UE 630 in response to reception of the RRC connection request message.

According to an embodiment, the C-RNTI is a value temporarily allocated by the first base station 610 and, if moved to another cell, a new C-RNTI is reallocated. For example, referring back to FIG. 6, if the UE 630 assigned C-RNTI 1 in Cell 0 moves to Cell 2 610c, the UE 630 may be assigned C-RNTI 2. By keeping on moving, the UE 630 may be located in Cell 3 620a among the cells (e.g., Cell 3 620a, Cell 4 620b, and Cell 5 620c) managed by the second base station (eNB) 620. The UE 630 may again perform cell discovery on the second base station 620, proceed with a radio access procedure on Cell 3 620a of the second base station 620, and be assigned C-RNTI 3.

According to an embodiment, the C-RNTI resource includes a value for differentiating UEs in the cell, and the UE 630 may attack the base stations 610 and 620 by changing the C-RNTI and sending a request for communication to the base station 610 or 620. For example, the attack may be a DoS attack on the base station 610 or 620 and may be referred to as a "BTS resource depletion attack." According to an embodiment, a specific device may perform an attack of depleting the RRC connection resources by allowing a specific base station to perform RRC connection while continuing to change the C-RNTI. Such attack causes no issue on the wireless communication protocol and may thus be difficult to judge as an attack.

According to an embodiment, in the case where in the example described above in connection with FIG. 5A, the first VNF module 541 includes a module performing the functions of a DU (e.g., when it is a virtualized module to replace the function of a piece of DU equipment), if the number of connected UEs in the cell, managed by itself, is a preset number or more, there may be determined to be an abnormal sign, and information related to the abnormal sign (security log) (e.g., abnormal sign-related information or information regarding the data or packet for which the abnormal sign has occurred) may be transferred to the security agent 550 of FIG. 5A, via the SM agent 541a.

According to an embodiment, if there is no response (e.g., an RRC complete message is not transmitted to the base station) after a preset number of, or more, UEs attempt RRC access within a preset time, the security agent 550 of FIG. 5A may determine that it is a DoS attack on the base station.

For example, upon performing MAC layer protocol processing on the received data according to the operation of the first VNF module 541 of FIG. 5A, the security agent 550 may identify the MAC layer data frame of the received data and determine whether there is an attack on the electronic device 120.

According to an embodiment, as described above in connection with FIG. 6, if the UE 630 transmits a PRACH preamble to the first base station 610, the first base station 610 may transmit a PRACH response to the UE 630. At this time, the MAC layer data frame corresponding to the PRACH response may be represented as illustrated below in FIG. 8.

Figure 8:
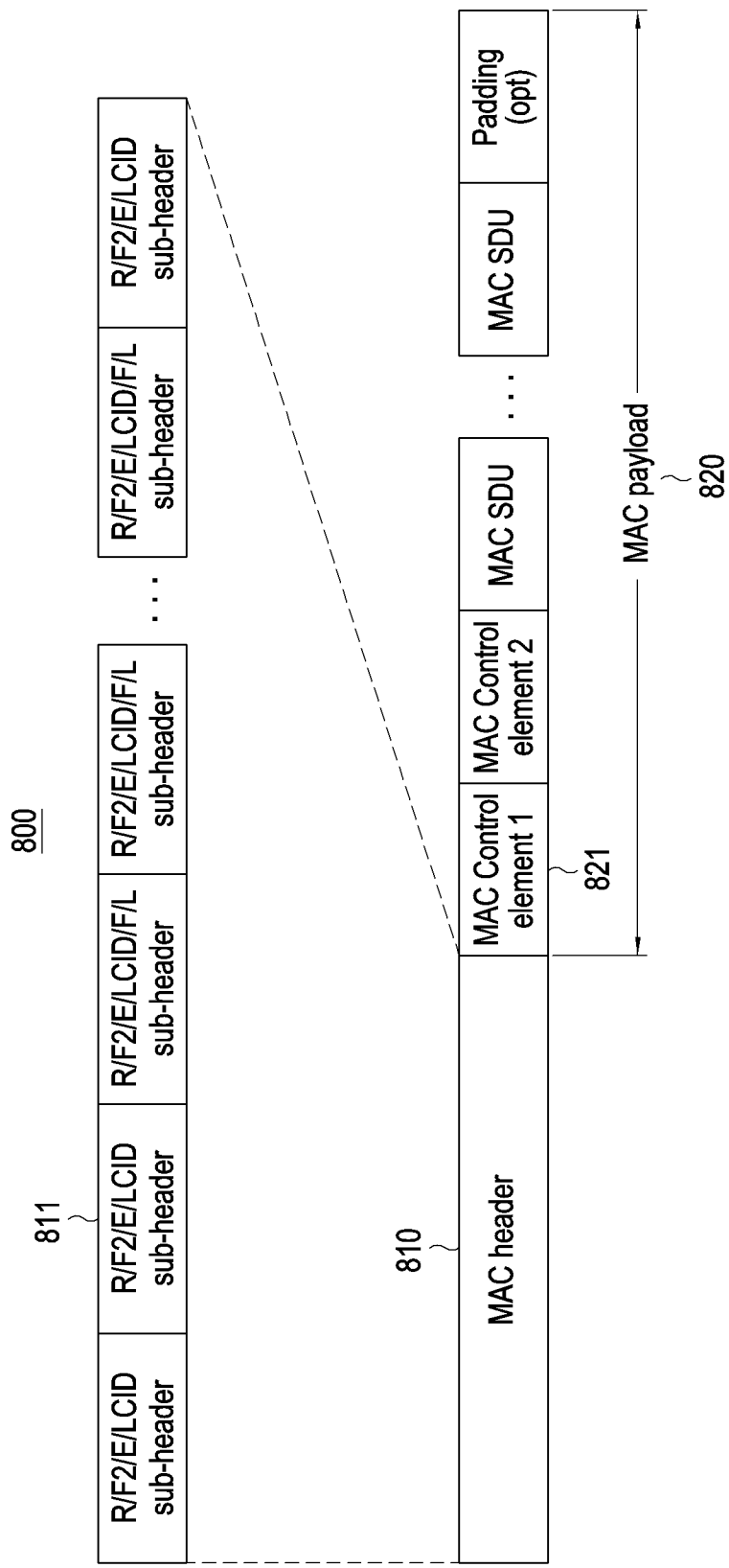
FIG. 8 is a diagram illustrating an example configuration of MAC PDU data processed by a VNF module according to an embodiment.
Figure 9:
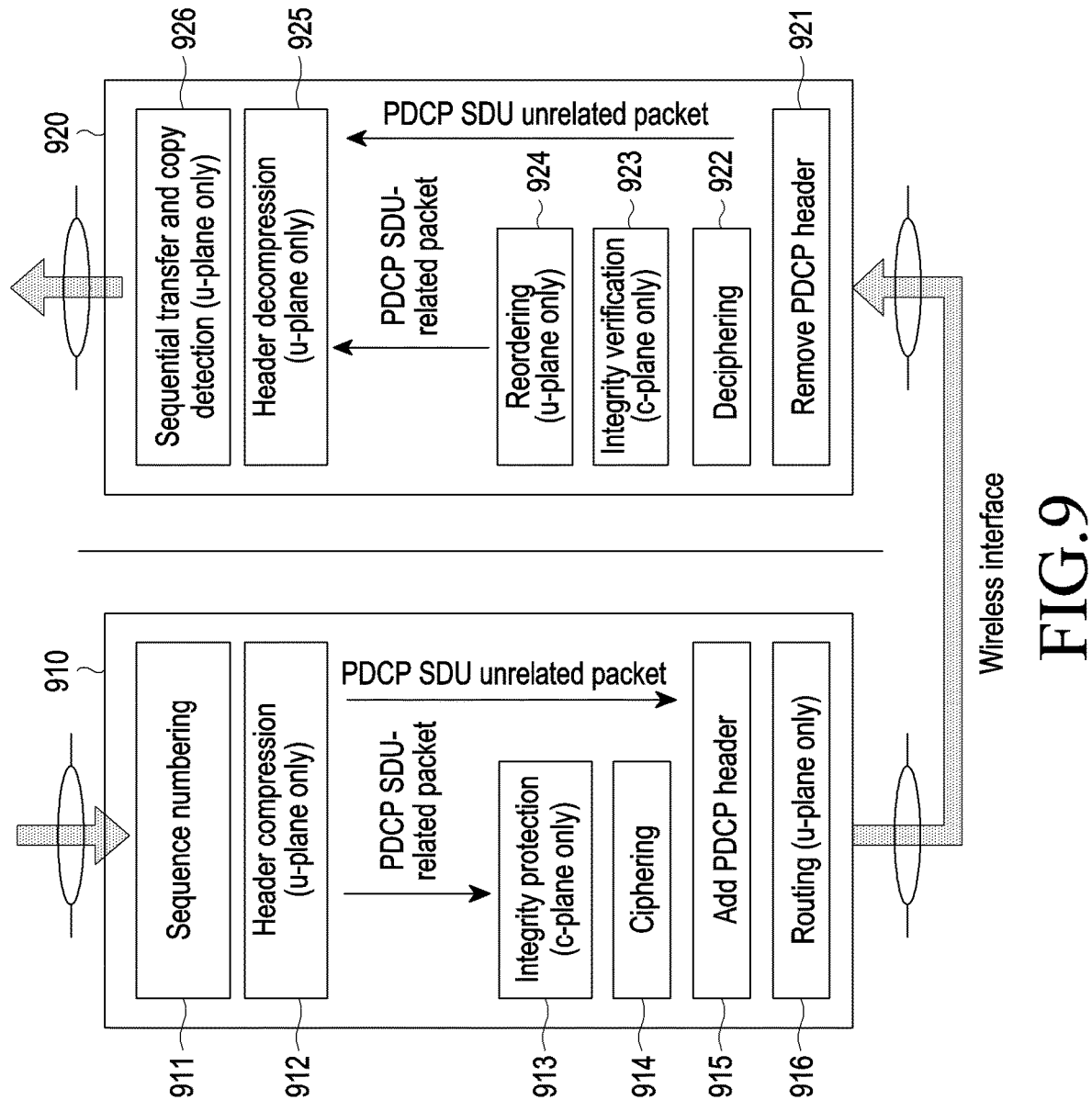
FIG. 9 is a diagram illustrating an example PDCP layer protocol processing procedure according to an embodiment.
Figure 10:
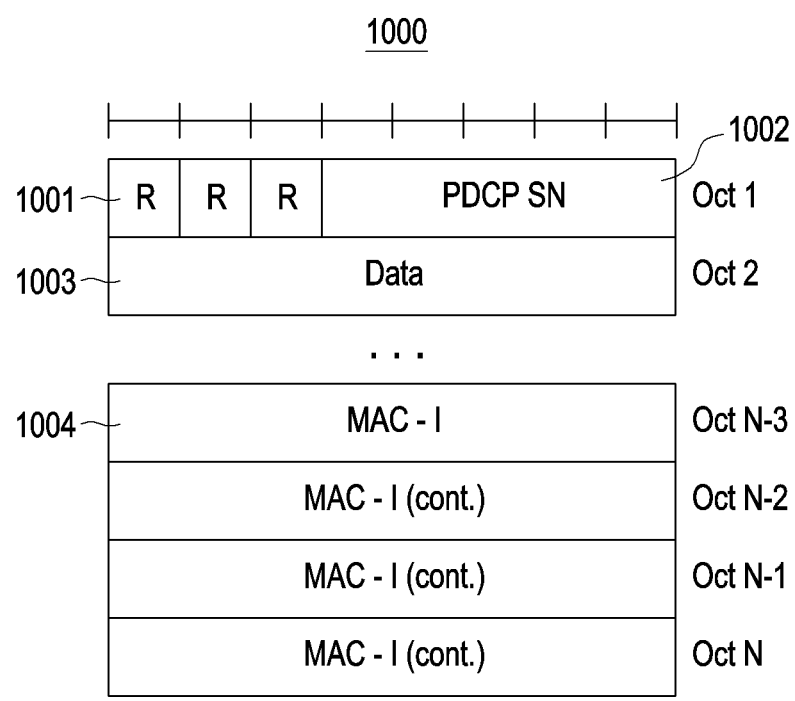
FIG. 10 is a diagram illustrating an example configuration of PDCP data processed by a VNF module according to an embodiment.

FIG. 8 is a diagram illustrating an example MAC layer data frame of the received data 800 identified in the security agent 550. Referring to FIG. 8, the MAC layer data frame of the received data 800 may include a MAC header 810 and a MAC payload 820. The MAC header 810 may include a plurality of subheaders 811. The MAC payload 820 may include at least one MAC control element 821, at least one MAC SDU, or a padding region. The MAC header 810 may indicate whether C-RNTI information is included in the MAC payload 820 or the location of the C-RNTI information in the MAC payload 820. The security agent 550 may identify the C-RNTI information in a specific location (e.g., the MAC control element 821) inside the MAC payload 820 by referring to the MAC header 810.

According to an embodiment, the security agent 550 of FIG. 5A may analyze the MAC layer data frame of FIG. 8, thereby identifying C-RNTI data. The identified C-RNTI data may be stored in the secure storage 552 of FIG. 5A. In the case where the secure storage 552 is identified and, as described above, the UEs with different C-RNTIs attempt RRC access a preset number of times or more or, after attempting RRC connection, receives no response (e.g., when no RRC complete message is transmitted to the base station) within a preset time, the security agent 550 may determine that the UEs perform a DoS attack on the base station 610 or 620 (e.g., the electronic device 120).

According to an embodiment, when specific UEs are determined to perform a DoS attack, the security agent 550 of FIG. 5A may provide identification information (e.g., C-RNTI information) about the UEs to the corresponding VNF module (e.g., the first VNF module 541) and instruct the first VNF module 541 to apply the security policy of dropping the data received from the UE.

According to an embodiment, upon determining that a specific UE is an attacking UE via the analysis module 541, the security server 110 may generate identification information about the UE as platooning information and transmit the same to the electronic device 120. The security agent 550 of the electronic device 120 may provide the identification information about the UE determined to be an attacking UE to at least one VNF module 541, 542, or 543 and instruct the VNF module 541, 542, or 543 to apply the security policy of dropping the data received from the UE.

As described above, upon determining that a specific UE is an attacking UE by the electronic device 120 or the security server 110, the VNF module (e.g., the first VNF module 541) performing the functions of a DU in the electronic device 120 may preemptively block the data received from the UE.

An embodiment in which the VNF module is a module performing the functions of a CU is described in greater detail below with reference to FIGS. 9, 10, 11 and 12.

According to an embodiment, in the case where the third VNF module 543 is a module performing the functions of a CU in the example described above in connection with FIG. 5A (e.g., when it is a virtualized module to replace the function of a piece of CU equipment), it may perform PDCP or RRC layer protocol data processing. For example, in FIG. 5A, the third VNF module 543 of the electronic device 120 may perform at least one of the PDCP layer protocol data processes described above in connection with FIG. 3.

FIGS. 9, 10, 11 and 12 are diagrams illustrating an example scenario in the PDCP layer according to an embodiment. According to an embodiment, the PDCP layer protocol may perform, e.g., packet ciphering, integrity verification, and header compression. For example, the third VNF module 543 of FIG. 5A may perform the PDCP layer protocol processing of FIG. 9 on transmit (Tx) data or receive (Rx) data.

According to an embodiment, the PDCP layer processing unit 910 on the transmit side may number each packet by performing sequence numbering 911 on the entered transmit (Tx) data. The PDCP layer processing unit 910 on the transmit side may perform header compression 912 when the transmit data is user plane (u-plane) data. Next, the PDCP layer processing unit 910 on the transmit side may perform an integrity protection procedure 913 on control plane (c-plane) data. The PDCP layer processing unit 910 on the transmit side may perform ciphering 914 when the data is PDCP SDU-related data. When the transmit data is PDCP SDU unrelated data, the PDCP layer processing unit 910 on the transmit side may skip integrity protection and ciphering and add a PDCP header 915. When the PDCP header-added transmit data is user plane data, the PDCP layer processing unit 910 on the transmit side may route 916 and transmit it to the wireless interface.

According to an embodiment, the receive data may be processed in a procedure reverse to that of the transmit data. For example, a PDCP layer processing unit 920 on the receive side may perform PDCP header removal 921 on the entered receive data and may then perform deciphering 922, integrity verification 923, and reordering 924. According to an embodiment, the PDCP layer processing unit 920 on the receive side may omit the integrity verification procedure on user plane data and may omit the reordering procedure on control plane data.

The PDCP layer processing unit 920 on the receive side may release 925 the header compression on the reordered user plane receive data and may then perform an in-order delivery and duplicate detection procedure 926. According to an embodiment, the PDCP layer processing unit 920 on the receive side may omit the deciphering, integrity verification, and reordering procedures on PDCP SDU unrelated packets.

When the PDCP layer protocol-processed data is control plane data, the PDCP payload may include an RRC message or non-access stratum (NAS) message. For example, referring to FIG. 10, the control plane PDCP data 1000 may include at least one R field 1001, a PDCP sequence number (SN) field 1002, a data field 1003, and a MAC-I field 1004. The R field 1001 may refer, for example, to the reserved region, and the PDCP SN field 1002 may refer, for example, to the PDCP sequence number. The data field 1003 may include an RRC message or NAS message as described above. The MAC-I may include data used for the integrity verification 923 of FIG. 9.

According to an embodiment, the security agent 550 of FIG. 5A may detect or defend attacks using the weaknesses in the RRC protocol when the third VNF module 543 operates as a CU. For example, a malicious UE may send an RRC connection request message, resultant from spoofing the SAE temporary mobile subscriber identity (S-TMSI) value of the target UE, to the base station to thereby disconnect the existing RRC connection. For example, the attack is a DoS attack on the UE and may be denoted "Blind DoS Attack." According to an embodiment, since the S-TMSI value is managed by the mobility management entity (MME), it may be determined via the remote security agent 510 of the security server 110 whether there is a security threat. According to an embodiment, to continuously block the attack, the spoofed RRC connection needs to be steadily sent out. In such a case, the CU may also determine whether there is the security threat or attack. For example, when the third VNF module 543 of FIG. 5A operates as a CU, the security agent 550 may identify continuous reception of the RRC connection transmitted from a specific UE and determine that access by the UE is a spoofing attack. When RRC connections transmitted from UEs in the managed cell occur a predetermined number of times or more within a predetermined time, or when an RRC connection reestablishment request is received again after an RRC connection request transmitted from a specific UE, the third VNF module 543 may determine that this is an abnormal sign and request the security agent 550 to determine whether there is a security threat or attack. According to an embodiment, when RRC connection is received a preset number of times or more from the specific UE within a preset time, the security agent 550 may determine that the UE is a UE performing a spoofing attack. For example, the security agent 550 may identify the RRC message via PDCP layer protocol processing on the received data and, when the above conditions are met, provide identification information (e.g., S-TMSI information) about the UE determined to be the attacking UE to at least one VNF module 541, 542, or 543. According to an embodiment, when RRC connection from the specific UE frequently occurs, an RRC connection reestablishment request is received again after the RRC connection request transmitted from the specific UE, the security agent 550 may identify the RRC message via PDCP layer protocol processing on the received data using a key (e.g., KRRCenc) for RRC communication with the specific UE. Upon identifying that the key (KRRCenc) for RRC communication is a valid key value as a result of identification of the RRC message, the security agent 550 may determine that the S-TMSI of the specific UE has been spoofed and provide the identification information about the UE determined to be the attacking UE to at least one VNF module 541, 542, or 543. The security agent 550 may instruct the corresponding VNF module 541, 542, or 543 to apply the security policy of dropping the data received from the UE. According to an embodiment, the security agent 550 may perform a procedure for reissuing the S-TMSI or instruct the corresponding VNF module 541, 542, or 543 to apply the security policy of reissuing an S-TMSI.

According to an embodiment, the security agent 550 may determine a "key reinstallation attack" to decipher the ciphered PDCP payload and defend the same. For example, when the attacker (or attacking UE) forces the base station to fail to receive a response signal transmitted from the UE by jamming, if the base station repeatedly sends out request messages for the response signal, then the UE's PDCP SN used for generating a UE key may be repeatedly reset. The attacker may perform an attack of figuring out the key via the response signal transmitted from the UE and ciphered with the same key generated. For the type of attack, it is impossible to identify whether the failure to receive the specific message comes from jamming or a communication issue and, thus, it may be hard to determine whether there is an anomaly or abnormality. According to an embodiment, when the request messages transmitted to the UEs in the managed cell occur a predetermined number of times or more within a preset time, the third VNF module 543 operating as a CU may determine that this is an abnormal sign and request the security agent 550 to determine whether there is a security threat or attack. When a specific message is transmitted to a specific UE a preset number of times or more within a preset time, the security agent 550 may determine that the corresponding UE is under a key resetting attack. For example, the security agent 550 may identify the RRC message via PDCP layer protocol processing on the received data and, when the above conditions are met, provide identification information about the UE determined to be the attacked UE to at least one VNF module 541, 542, or 543. According to an embodiment, the security agent 550 may instruct the VNF module 541, 542, or 543 to re-perform the RRC security mode procedure with the UE to vary the key (KRRCenc) value for RRC communication. According to an embodiment, when the above-described weakness in protocol or implementation is discovered, a quick response may be taken on all the CUs via the security agent 550.

According to an embodiment, the security agent 550 of FIG. 5A may detect or defend attacks on the IP layer or higher layers when the third VNF module 543 operates as a CU. For example, when the third VNF module 543 of FIG. 5A operates as a CU, the security agent 550 may receive a KUPenc for deciphering the IP packet with the specific UE from the third VNF module 543 and decipher and identify the PDCP payload (e.g., IP packet) transmitted from the specific UE, thereby detecting or defending attacks on the IP layer or its higher layers.

Figure 11:
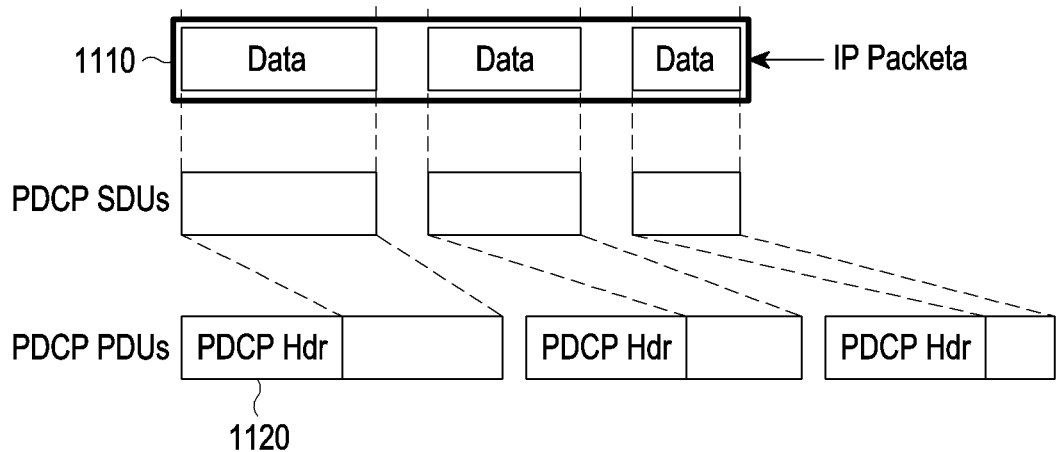
FIG. 11 is a diagram illustrating an example configuration of PDCP data processed by a VNF module according to an embodiment.
Figure 12:
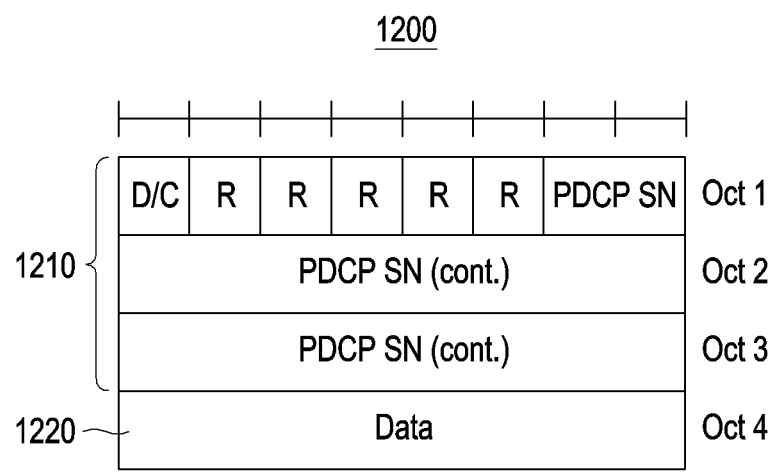
FIG. 12 is a diagram illustrating an example configuration of PDCP data processed by a VNF module according to an embodiment.

FIG. 11 is a diagram illustrating an example structure of a PDCP PDU. A PDCP PDU may include a PDCP header 1120 and a PDCP payload. The PDCP payload may include an IP packet 1110 as a PDCP SDU. Referring to FIG. 12, the user plane PDCP data 1200 may include a header region 1210 and a data region 1220. The header region 1210 may include a D/C field, an R field, and a PDCP SN field. The D/C field may indicate whether the PDCP data 1200 is user data or control data. The data region 1220 may include an IP packet, and the IP packet may include an IP header and an IP payload. The IP header of the IP packet may include a source IP address and a destination IP address.

According to an embodiment, the security agent 550 may detect various attacks (e.g., DNS amplification or SYN spoofing) using IP address spoofing and may previously block it. According to an embodiment, when the PDCP data 1200 transmitted from the UEs in the managed cell is user data, and the amount of data accumulated for a predetermined time is a predetermined amount or more or is received a predetermined number of times or more, the third VNF module 543 operating as a CU may determine that it is an abnormal circumstance and request the security agent 550 to determine whether there is an attack. For example, the security agent 550 may receive the KUPenc for deciphering the IP packet with the specific UE from the third VNF module 543 and compare the IP address of the received data with the IP address allocated to the UE. When the IP addresses are not identical as a result of comparison, the security agent 550 may determine that there is an attack using IP address spoofing and apply the policy of filtering the data. For example, the security agent 550 may provide the identification information (e.g., S-TMSI information) about the UE determined to be an attacking UE to at least one VNF module 541, 542, or 543 and instruct it to apply the policy of filtering the data. According to an embodiment, the IP address of the attacking UE may be determined via the remote security agent 510 of the security server 110. For example, the security agent 550 may identify the IP packet determined to be malicious from the security server 110, receive the source IP address of the IP packet, and provide the received IP address to at least one VNF module 541, 542, or 543. The security agent 550 may instruct the corresponding VNF module 541, 542, or 543 to apply the security policy of dropping the data received from the corresponding IP address.

According to an embodiment, the above-described roles of the intrusion detection system (IDS)/intrusion prevention system (IPS) for the IP layer may be performed by a regular network via a CU, but the security agent 550 may use additional information for the UE using RRC connection and the electronic device 120 may block it in advance, thereby reducing network traffic.

According to an embodiment, the security agent 550 may set the UE transmitting wireless communication network protocol data, which does not observe the RRC protocol, as a UE required to be monitored, determine whether there is an attack by monitoring all the time, and defend attacks. For example, when the third VNF module 543 of FIG. 5A operates as a CU, if a specific UE transmits an RRC message in the state of sending no message containing an RRC security mode-related protocol, the third VNF module 543 may determine that this is an abnormal sign. In this case, the wireless communication network protocol sent from the UE has not been ciphered or integrity-checked and is thus vulnerable to security. Thus, the third VNF module 543 may transfer information regarding the abnormal sign or information about the specific UE to the security agent 550, requesting the security agent 550 to perform monitoring. According to an embodiment, the security agent 550 may register the specific UE as a UE required to be monitored all the time, identify the RRC message via PDCP layer protocol processing on the data received from the specific UE, and then determine that the registered UE is a UE attacking in a smaller number of times than a preset number. According to an embodiment, the security agent 550 may identify that the PDCP message has not been ciphered and may additionally analyze the non-ciphered PDCP payload. For example, the security agent 550 may analyze the header information on the IP packet 1110 with a pre-configured security rule or PDCP SDU to thereby check if it is malicious IP and then determine whether there is an attack. According to an embodiment, when the above-described condition is met, the security agent 550 may provide identification information about the UE determined to be the attacking UE to at least one VNF module 541, 542, or 543. The security agent 550 may instruct the corresponding VNF module 541, 542, or 543 to apply the security policy of dropping the data received from the UE.

Figure 13:
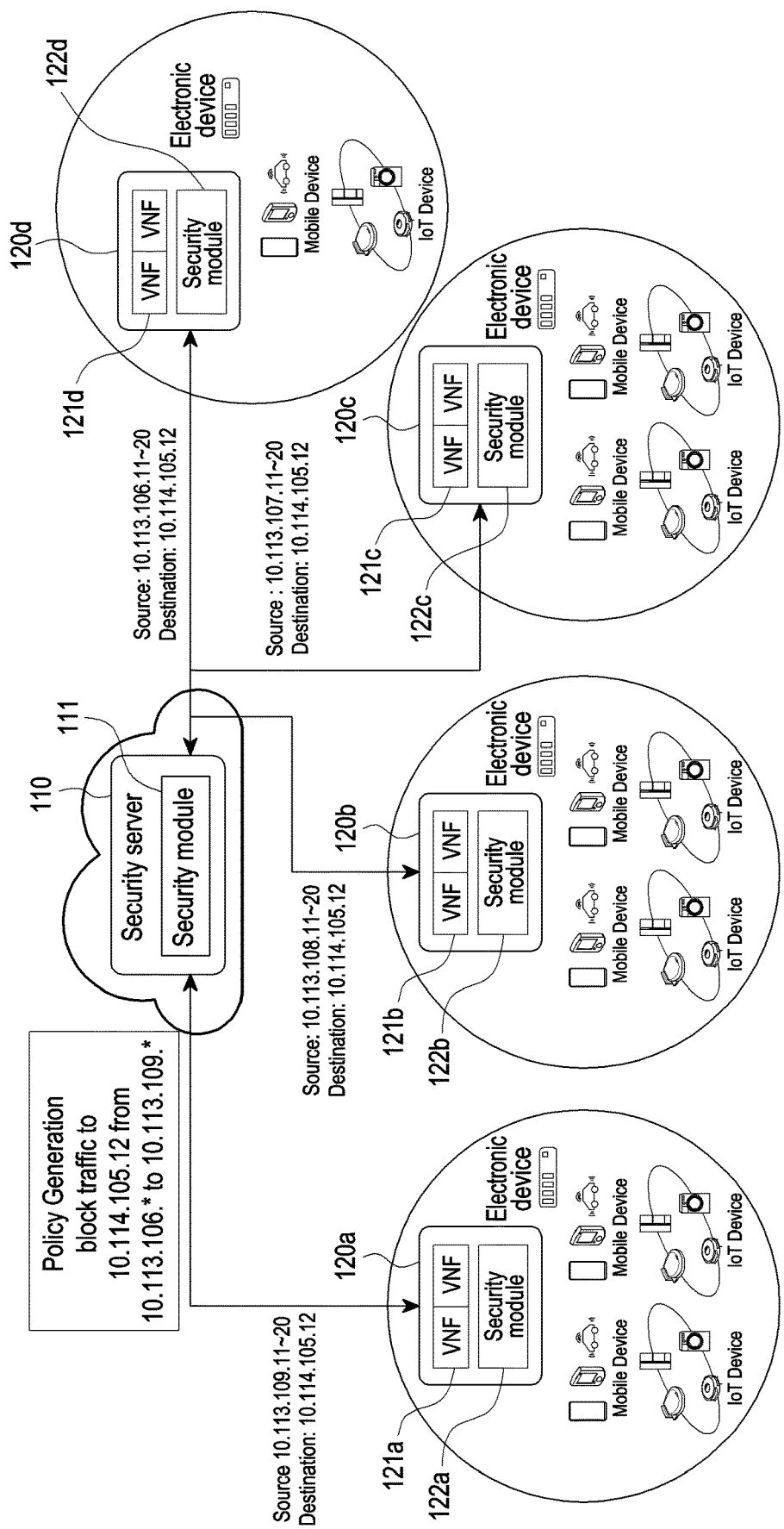
FIG. 13 is a diagram illustrating an example of applying a security policy while interworking with a security server according to an embodiment.
Figure 14:
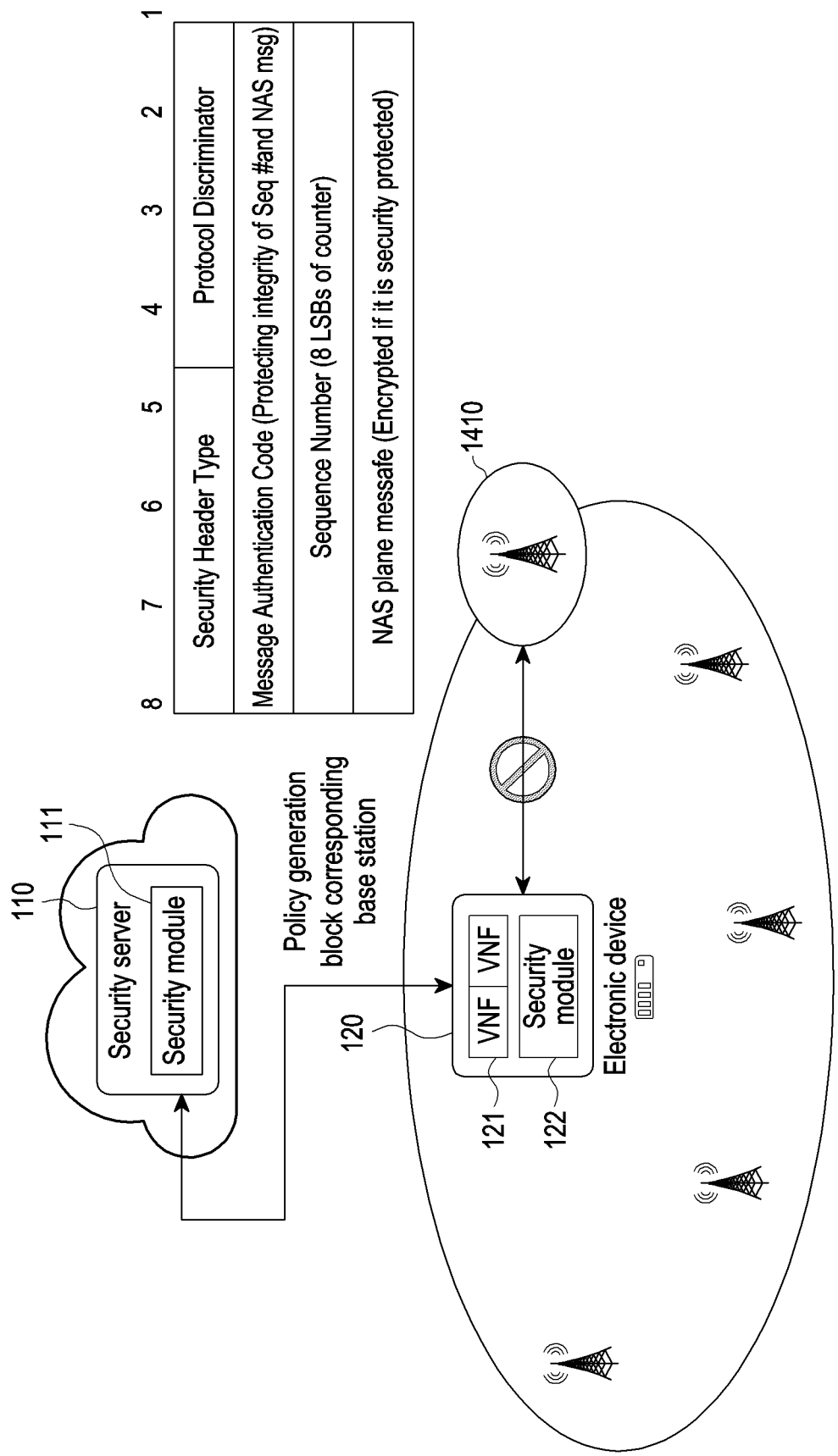
FIG. 14 is a diagram illustrating an example of applying a security policy while interworking with a security server according to an embodiment.

FIGS. 13 and 14 are diagrams illustrating an example of applying a security policy while interworking with a security server according to an embodiment. Referring to FIG. 13, the respective security modules 122a, 122b, 122c, and 122d of electronic devices 120a, 120b, 120c, and 120d may determine a security threat based on security information generated as VNF modules 121a, 121b, 121c, and 121d operate and, according to a result of determination, generate a security report and transmit the security report to the security module 111 of the security server 110.

For example, the security module 122a of the first electronic device 120a may analyze the data based on security information generated as the VNF module 121a operates and transmit a security report including the source IP address and destination IP address (Source: 10.113.109.11 to 20, Destination: 10.114.105.12) of the data (or IP packet) for which a security threat is expected as a result of analysis to the security module 111 of the security server 110.

Likewise, the security module 122b of the second electronic device 120b may analyze the data based on security information generated as the VNF module 121b operates and transmit a security report including the source IP address and destination IP address (Source: 10.113.108.11 to 20, Destination: 10.114.105.12) of the data (or IP packet) for which a security threat is expected as a result of analysis to the security module 111 of the security server 110.

Likewise, the security module 122c of the third electronic device 120c may transmit a security report including the source IP address and destination IP address (Source: 10.113.107.11 to 20, Destination: 10.114.105.12) of the data (or IP packet) for which a security threat is expected to the security module 111 of the security server 110, and the security module 122d of the fourth electronic device 120d may transmit a security report including the source IP address and destination IP address (Source: 10.113.106.11 to 20, Destination: 10.114.105.12) of the data (or IP packet) for which a security threat is expected to the security module 111 of the security server 110.

Upon receiving the security reports from the electronic devices 120a, 120b, 120c, and 120d, the security server 110 may analyze the information included in the security reports, generating a new security policy. For example, when the packet transmitted from the device corresponding to the addresses from 10.113.106.* to 10.113.109.* is directed to the destination 10.114.105.12 as a result of analysis of the information included in the security reports received from the electronic devices 120a, 120b, 120c, and 120d, the security module 111 of the security server 110 may determine that the packet is a packet threatening security (e.g., DDoS attack) and generate security policy information to block the packet. The security server 110 may transmit the generated security policy information to the security module 122*a*, 122*b*, 122*c*, or 122*d* of each electronic device 120*a*, 120*b*, 120*c*, or 120*d*. The security module 122*a*, 122*b*, 122*c*, or 122*d* of each electronic device 120*a*, 120*b*, 120*c*, or 120*d* may instruct each VNF module 121*a*, 121*b*, 121*c*, or 121*d* to apply the security policy information received from the security server 110.

When the packets transmitted from the devices corresponding to the addresses from 10.113.106.* to 10.113.109.* are directed to the destination 10.114.105.12 according to the security policy newly applied to each VNF module 121*a*, 121*b*, 121*c*, or 121*d*, the packets may be handled to be dropped.

Referring to FIG. 14, the security module 122 of the electronic device 120 may determine a security threat based on security information generated as VNF module 121 operates and, according to a result of determination, transmit a security report to the security module 111 of the security server 110. For example, the security module 122 of the electronic device 120 may check the NAS message of the received message and, upon determining that there is a likelihood of security threat, transmit the NAS message to the security server 110. Upon determining that there is a security threat as a result of analysis of the NAS message transmitted from the security module 122 of the electronic device 120, the security module 111 of the security server 110 may generate new security policy information related thereto. For example, the security module 111 of the security server 110 may analyze the message authentication code (MAC) information included in the NAS message, sequence number, and NAS message and, when the MAC information has an error, the sequence number is duplicate, or the NAS message is plain text which has not been ciphered, the security module 111 of the security server 110 may determine that the NAS message has a security threat.

The security module 111 of the security server 110 may generate security policy information to block the base station 1410 which has transmitted the NAS message and provide the security policy information to the security module 122 of the electronic device 120.

The security module 122 of each electronic device 120 may instruct each VNF module 121 to apply the security policy information received from the security server 110. According to the security policy newly applied to each VNF module 121, the base station 1410 may be blocked off, or the data transmitted from the base station 1410 all may be dropped.

Figure 15:
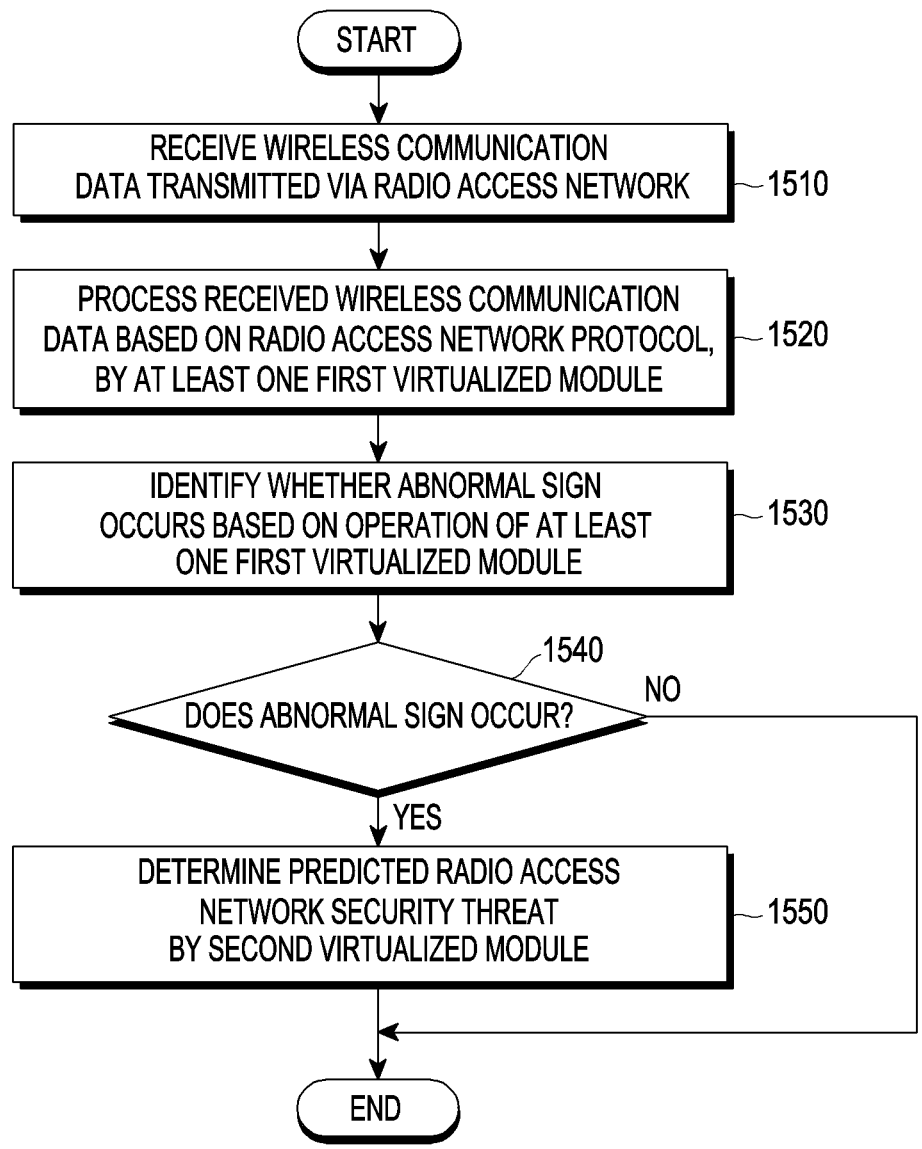
FIG. 15 is a flowchart illustrating an example operation procedure by an electronic device according to an embodiment.

FIG. 15 is a flowchart illustrating an example operation procedure by an electronic device according to an embodiment. Referring to FIG. 15, according to an embodiment, the electronic device 120 may receive wireless communication data transmitted via a radio access network in operation 1510.

In operation 1520, the electronic device 120 may process the received wireless communication data, based on a radio access network protocol, by at least one first virtualized module (e.g., the VNF module 121).

In operation 1530, the electronic device 120 may identify an abnormal sign based on the received wireless communication data or a result of processing of the wireless communication data, by the at least one first virtualized module.

Upon determining that there is an abnormal sign for the data as a result of the identification, the electronic device 120 may transfer the security information showing the abnormal sign to a second virtualized module (e.g., the security agent 550) in operation 1540 and, in operation 1550, the electronic device 120 may determine a security threat on the radio access network based on the security information showing the abnormal sign, by the second virtualized module (e.g., the security agent 550).

Figure 16:
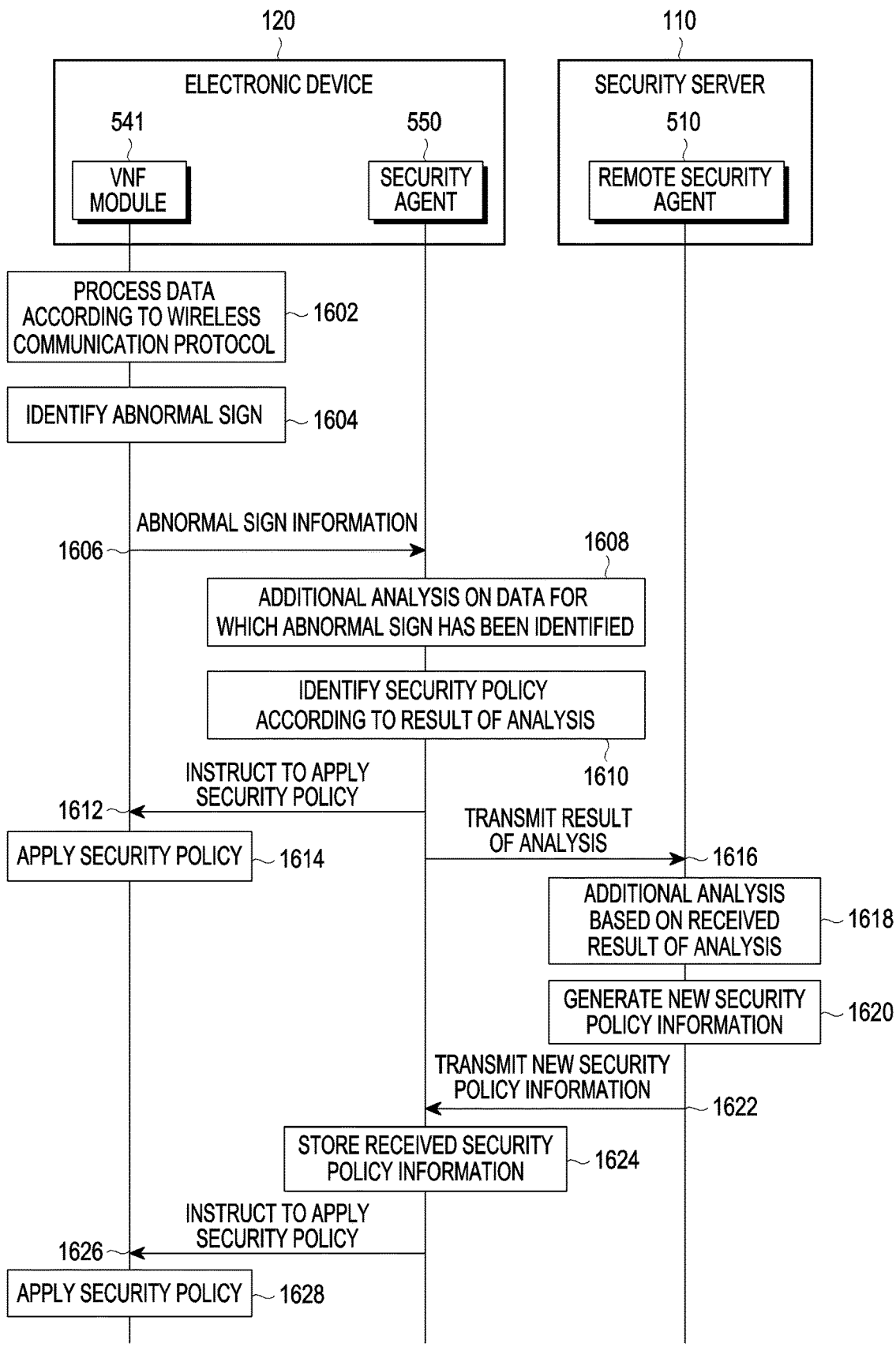
FIG. 16 is a signal flow diagram illustrating an example operation procedure between devices according to an embodiment.

FIG. 16 is a signal flow diagram illustrating an example operation procedure between devices according to an embodiment. Referring to FIG. 16, according to an embodiment, a VNF module 541 of an electronic device 120 may process data according to a wireless communication protocol in operation 1602.

In operation 1604, the VNF module 541 may identify an abnormal sign based on the received wireless communication data or a result of processing of the wireless communication data.

In operation 1606, the VNF module 541 may transfer abnormal sign-related information (e.g., abnormal sign information, identification information (e.g., packet identification information) regarding the abnormal sign-identified data (or packet), or the abnormal sign-identified data (or packet)) for the identified abnormal sign to the security agent 550 in the electronic device 120.

In operation 1608, the security agent 550 may additionally analyze the abnormal sign-identified data and, in operation 1610, generate a new security policy or identify a preconfigured security policy according to the result of analysis.

In operation 1612, the security agent 550 may instruct the VNF module 541 to apply the new security policy or identified security policy.

In operation 1614, the VNF module 541 may receive an instruction to apply the security policy of the security agent 550 and apply the security policy.

According to an embodiment, in operation 1616, the security agent 550 may transmit the result of analysis to the remote security agent 510 of the security server 110.

In operation 1618, the remote security agent 510 may perform additional analysis based on the result of analysis received from the security agent 550 of the electronic device 120.

In operation 1620, the remote security agent 510 may generate new security policy information as a result of the additional analysis.

In operation 1622, the remote security agent 510 may transmit the generated new security policy information to the security agent 550 of the electronic device 120.

In operation 1624, the security agent 550 of the electronic device 120 may store the new security policy information received from the remote security agent 510 of the security server 110.

In operation 1626, the security agent 550 may instruct the VNF module 541 to apply the received new security policy.

In operation 1628, the VNF module 541 may receive the instruction to apply the new security policy of the security agent 550 and apply the security policy.

According to an example embodiment, a method for determining a security threat on a radio access network by an electronic device comprises: receiving wireless communication data transmitted via a radio access network, processing the received wireless communication data based on a radio access network protocol by at least one first virtualized module corresponding to at least one function of the radio access network, identifying an abnormal sign based on the wireless communication data or a result of processing of the wireless communication data by the at least one first virtualized module, transferring information related to the wireless communication data to a second virtualized module by the at least one first virtualized module, and determining an expected security threat on the radio access network based on the abnormal sign-identified wireless communication data-related information by the second virtualized module.

According to an example embodiment, generating the security information may include generating the wireless communication data-related security information by a security monitoring (SM) daemon executed in the VNF module.

According to an example embodiment, the VNF module may process the received wireless communication data based, for example, and without limitation, on at least one of packet data convergence protocol entity (PDCP) layer processing, radio link control entity (RLC) layer processing, medium access control (MAC) layer processing, or physical entity (PHY) layer processing.

According to an example embodiment, the expected security threat on the radio access network may include, for example, and without limitation, at least one of denial of service (DoS), distributed DoS (DDoS), spoofing, or exploit attack.

According to an example embodiment, the security agent may determine the security threat by identifying data of a higher layer than a radio network layer processed by the first virtualized module based on the generated security information.

According to an example embodiment, the security agent may transmit a configured countermeasure to the at least one first virtualized module upon determining the expected security threat on the radio access network. The configured countermeasure may include, for example, and without limitation, at least one of a drop, unresponsive, or alert process for the wireless communication data.

According to an example embodiment, the first virtualized module may determine that there is the abnormal sign based on more than a designated number of data bytes or data packets being received within a designated time, based on more than a designated number of terminals transmitting wireless communication data, or based on a specific wireless communication protocol being identified on a payload of the received wireless communication data, a designated number of times or more.

According to an example embodiment, the second virtualized module may identify payload information for the received wireless communication data and determine the security threat on the radio access network based, for example, and without limitation, on at least one of terminal identification information, a number of times of transmission or reception of a wireless communication protocol, or ciphered-or-not.

The electronic device according to various example embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device configured to perform a radio access network function, the electronic device comprising:
    a communication interface comprising communication circuitry;
    a processor operatively connected with the communication interface; and
    a memory operatively connected with the processor, wherein
    the processor is configured to:
    receive, via the communication interface, wireless communication data transmitted via a radio access network by a terminal,
    process the received wireless communication data based on a radio access network protocol by at least one first virtualized module corresponding to at least one function of the radio access network,
    identify an abnormal sign based on the received wireless communication data and/or a result of processing of the wireless communication data by the at least one first virtualized module,
    based on identifying the abnormal sign, transfer security information indicating the abnormal sign to a second virtualized module by the at least one first virtualized module, each of the first and second virtualized modules comprising circuitry configured to execute instructions,
    identify payload information for the received wireless communication data by the second virtualized module, and
    determine an expected security threat on the radio access network based on at least one of terminal identification information of the terminal or a number of times of reception of messages and/or data from the terminal by the second virtualized module,
    wherein the at least one first virtualized module and the second virtualized module are to be executed via the processor of the electronic device.

2. The electronic device of claim 1, wherein the at least one first virtualized module includes a virtual network function (VNF) configured to process the wireless communication data based on a wireless network protocol.

3. The electronic device of claim 2, wherein the second virtualized module includes a security agent (SA) configured to process a function related to security for the at least one first virtualized module while interworking with the at least one first virtualized module.

4. The electronic device of claim 1, wherein the instructions, when executed, cause the processor to generate security information related to the wireless communication data by a security monitoring (SM) module executed in the first virtualized module.

5. The electronic device of claim 1, wherein the first virtualized module is configured to process the received wireless communication data based on at least one of packet data convergence protocol entity (PDCP) layer processing, radio link control entity (RLC) layer processing, medium access control (MAC) layer processing, or physical entity (PHY) layer processing.

6. The electronic device of claim 1, wherein the expected security threat on the radio access network includes at least one of denial of service (DoS), distributed DoS (DDoS), spoofing, or exploit attack.

7. The electronic device of claim 1, wherein the second virtualized module is configured to determine the security threat by identifying data of a higher layer than a radio network layer processed by the at least one first virtualized module based on the security information.

8. The electronic device of claim 1, wherein the second virtualized module is configured to transmit a configured countermeasure to the at least one first virtualized module upon determining the expected security threat on the radio access network.

9. The electronic device of claim 8, wherein the configured countermeasure includes at least one of a drop, unresponsive, or alert process for the wireless communication data.

10. The electronic device of claim 1, wherein the second virtualized module is configured to identify wireless communication data corresponding to the security information to generate a security report, and transmit the generated security report to a security server configured to manage security of equipment which perform the radio access network function.

11. The electronic device of claim 10, wherein the second virtualized module is configured to: receive a security policy corresponding to the at least one first virtualized module from the security server, and apply the received security policy to a first virtualized module corresponding to the security policy among the at least one first virtualized module.

12. The electronic device of claim 1, wherein the first virtualized module is configured to determine that there is the abnormal sign based on more than a designated number of data bytes or data packets being received within a designated time, based on more than a designated number of terminals transmitting wireless communication data, or based on a specific wireless communication protocol being identified on a payload of the received wireless communication data, a designated number of times or more.

13. A method for determining a security threat on a radio access network by an electronic device, the method comprising:
    receiving wireless communication data transmitted via a radio access network by a terminal;
    processing the received wireless communication data based on a radio access network protocol by at least one first virtualized module corresponding to at least one function of the radio access network;

identifying an abnormal sign based on the wireless communication data and/or a result of processing of the wireless communication data by the at least one first virtualized module;
based on identifying the abnormal sign, transferring security information related to the wireless communication data to a second virtualized module by the at least one first virtualized module;
identifying payload information for the received wireless communication data by the second virtualized module; and
determining an expected security threat on the radio access network based on at least one of terminal identification information of the terminal or a number of times of reception of messages and/or data from the terminal,
wherein the at least one first virtualized module and the second virtualized module are executed on the electronic device.

14. The method of claim 13, wherein the first virtualized module is configured to process the received wireless communication data based on at least one of packet data convergence protocol entity (PDCP) layer processing, radio link control entity (RLC) layer processing, medium access control (MAC) layer processing, or physical entity (PHY) layer processing.

15. The method of claim 13, wherein the expected security threat on the radio access network includes at least one of denial of service (DoS), distributed DoS (DDoS), spoofing, or exploit attack.

16. The method of claim 13, wherein the second virtualized module is configured to determine the security threat by identifying data of a higher layer than a radio network layer processed by the at least one first virtualized module based on the generated security information.

17. The method of claim 13, wherein the second virtualized module is configured to:
transmit a configured countermeasure to the at least one first virtualized module upon determining the expected security threat on the radio access network, and wherein the configured countermeasure includes at least one of a drop, unresponsive, or alert process for the wireless communication data.

18. The method of claim 13, wherein the first virtualized module is configured to: determine that there is the abnormal sign based on more than a designated number of data bytes or data packets being received within a designated time, based on more than a designated number of terminals transmitting wireless communication data, or based on a specific wireless communication protocol being identified on a payload of the received wireless communication data, a designated number of times or more.

* * * * *